United States Patent [19]

Yano

[11] Patent Number: 4,794,590

[45] Date of Patent: Dec. 27, 1988

[54] COMMUNICATION NETWORK CONTROL SYSTEM

[75] Inventor: Takashi Yano, Tokyo, Japan

[73] Assignee: Ricoh Company, Limited, Tokyo, Japan

[21] Appl. No.: 892,146

[22] Filed: Jul. 30, 1986

[30] Foreign Application Priority Data

Jul. 31, 1985 [JP] Japan .................................. 60-170428
Jul. 31, 1985 [JP] Japan .................................. 60-170429

[51] Int. Cl.[4] .......................... H04J 3/24; H04Q 11/04
[52] U.S. Cl. ............................................ 370/60; 370/94
[58] Field of Search ............................. 370/94, 60, 58; 340/825.79, 825.8

[56] References Cited

U.S. PATENT DOCUMENTS

| | | | |
|---|---|---|---|
| 4,314,367 | 2/1982 | Bakka et al. ........................... | 370/94 |
| 4,445,214 | 4/1984 | Reynolds et al. ...................... | 370/94 |
| 4,475,188 | 10/1984 | Wilson et al. ......................... | 370/60 |
| 4,630,045 | 12/1986 | Georgiou ........................ | 340/825.79 |

*Primary Examiner*—Douglas W. Olms
*Assistant Examiner*—Min Jung
*Attorney, Agent, or Firm*—Cooper & Dunham

[57] ABSTRACT

A communication network includes a plurality of nodes, which are interconnected by transmission lines, and a plurality of terminals connected to selected ones of the plurality of nodes, each of the nodes includes a plurality of input channels, a plurality of output channels and a connection control unit for controlling connection between the input and output channels. When an input signal is received by one of the input channels, it is once supplied to all of the output channels. Then, an input channel which has received the input channel in the first place is detected and then all of the input channels excepting the one having received the input channel in the first place are disconnected from the output channels, thereby preventing the preamble of the signal from being lost partly. If the control means has a capability of storing information of one or more of the input channels, the node can be shared by two or more transmission lines, thereby allowing to carry out a multiple of communications through the same node.

18 Claims, 28 Drawing Sheets

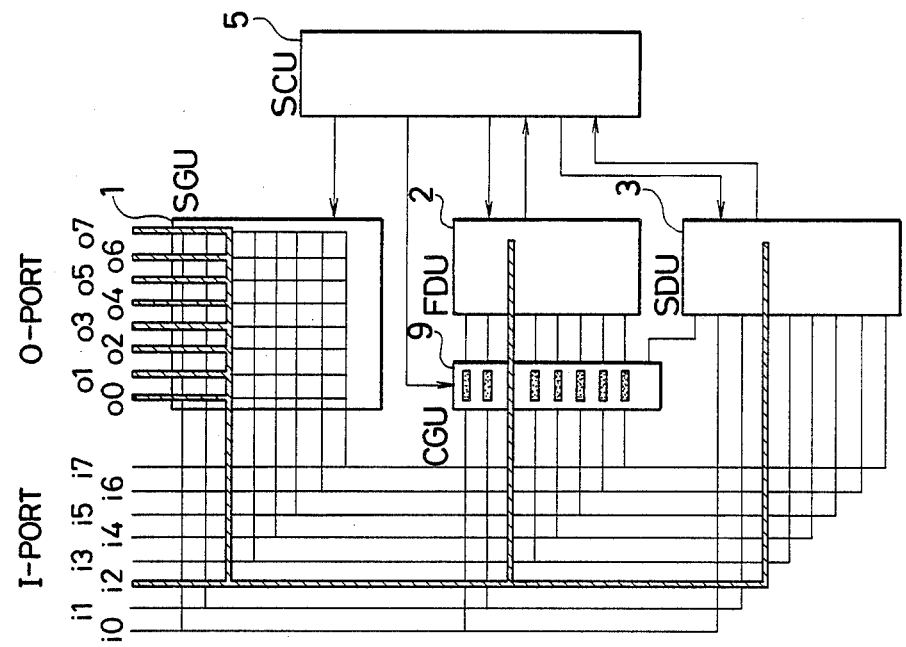
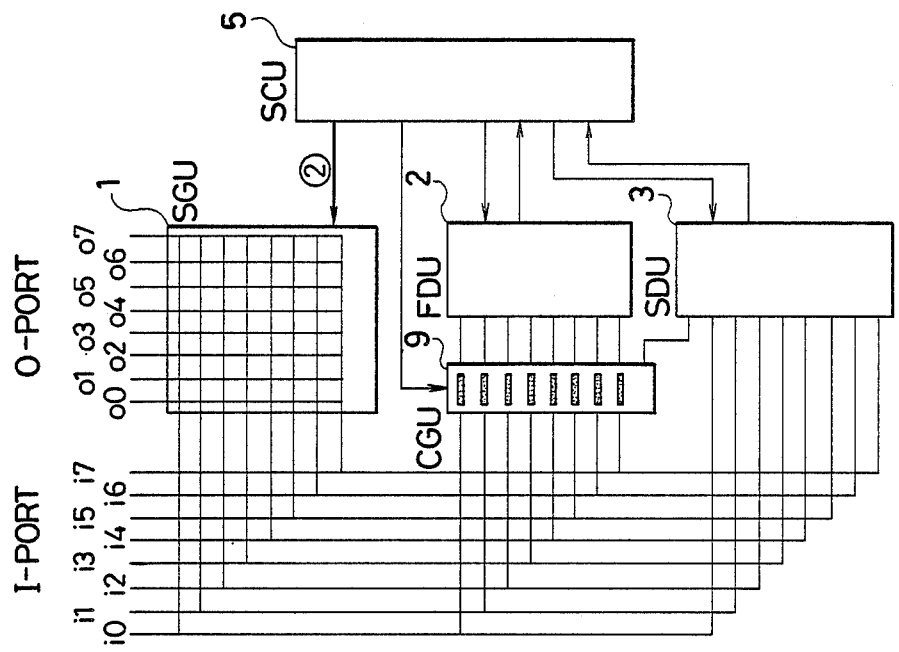

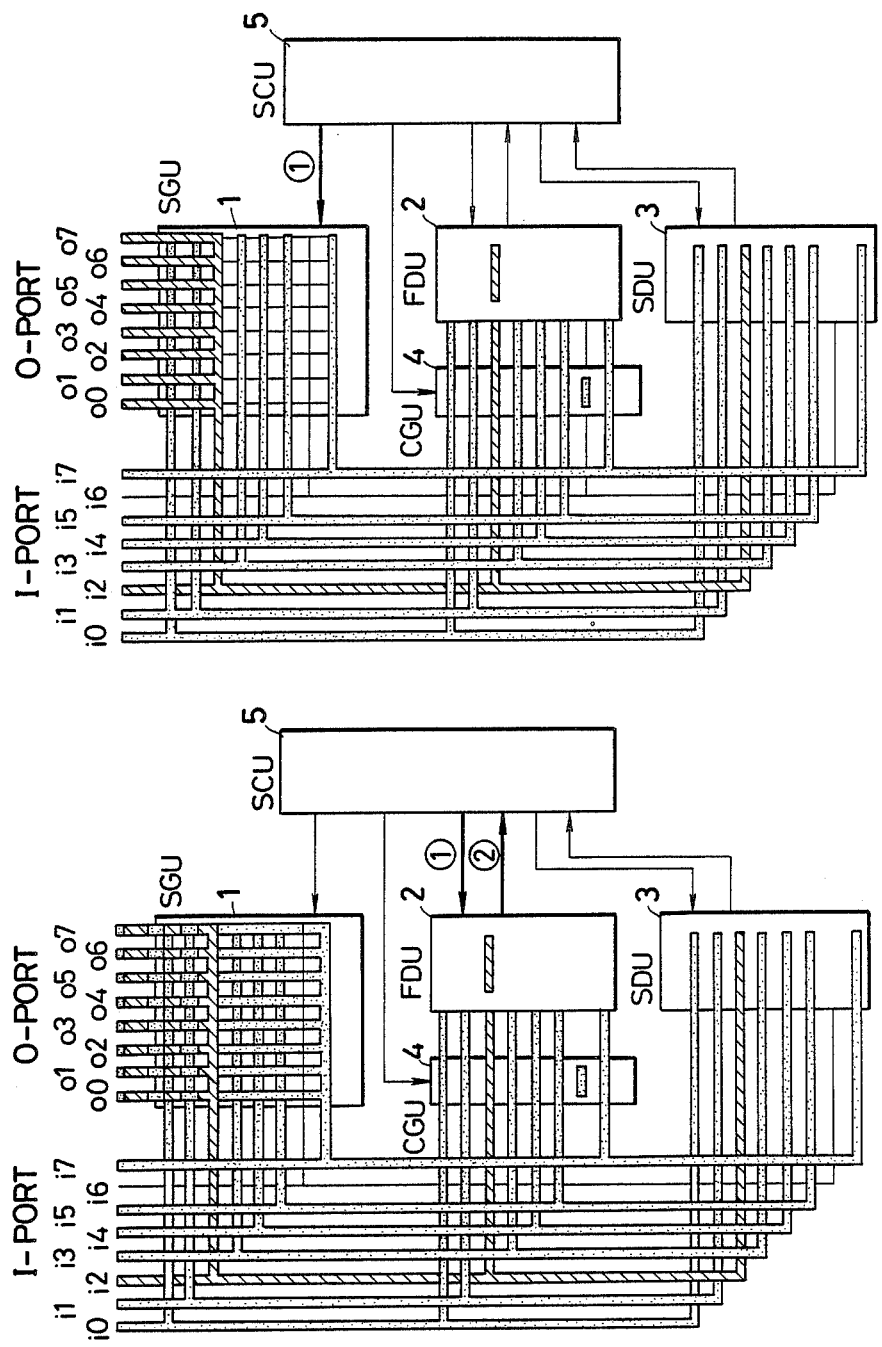

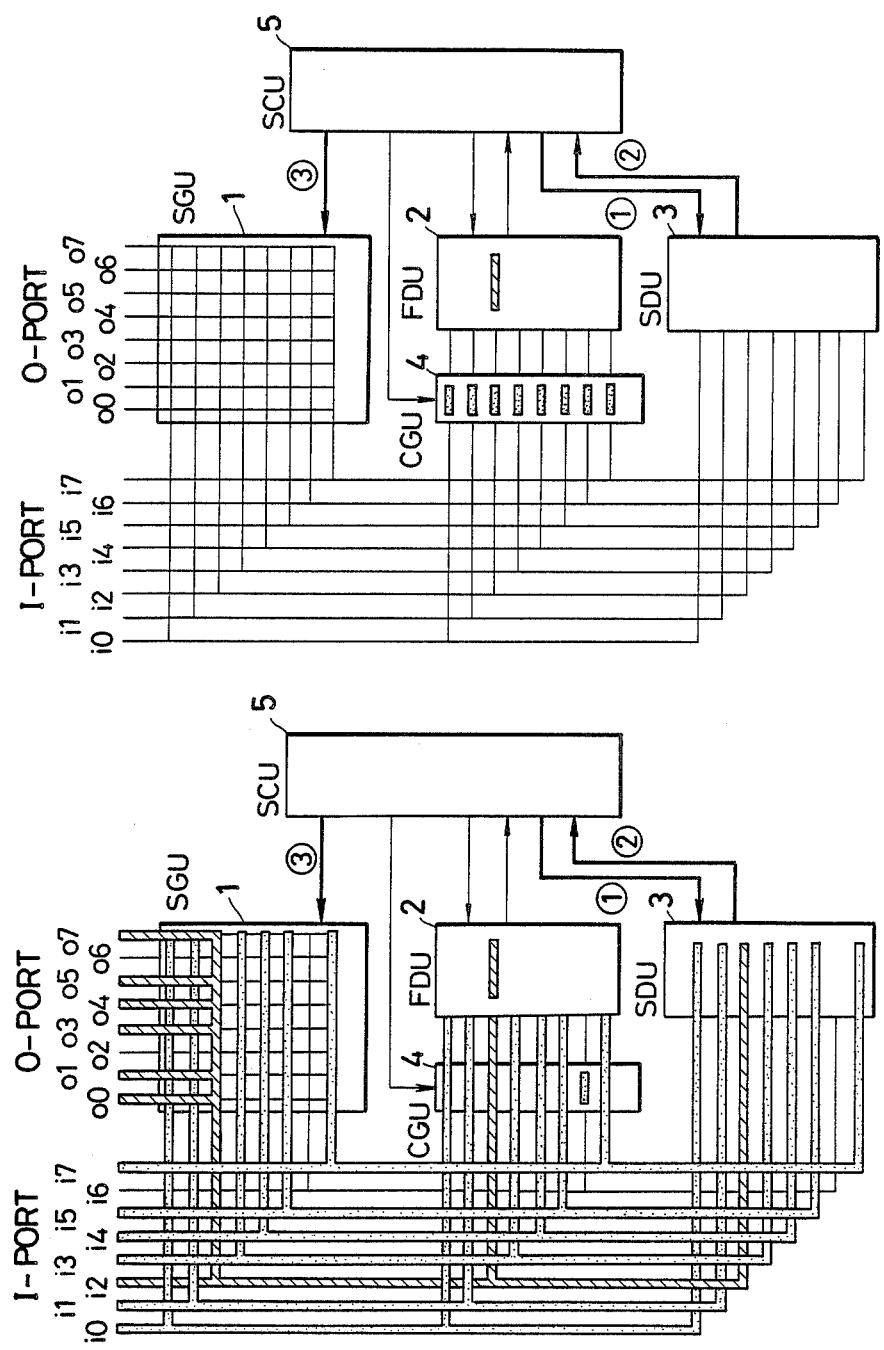

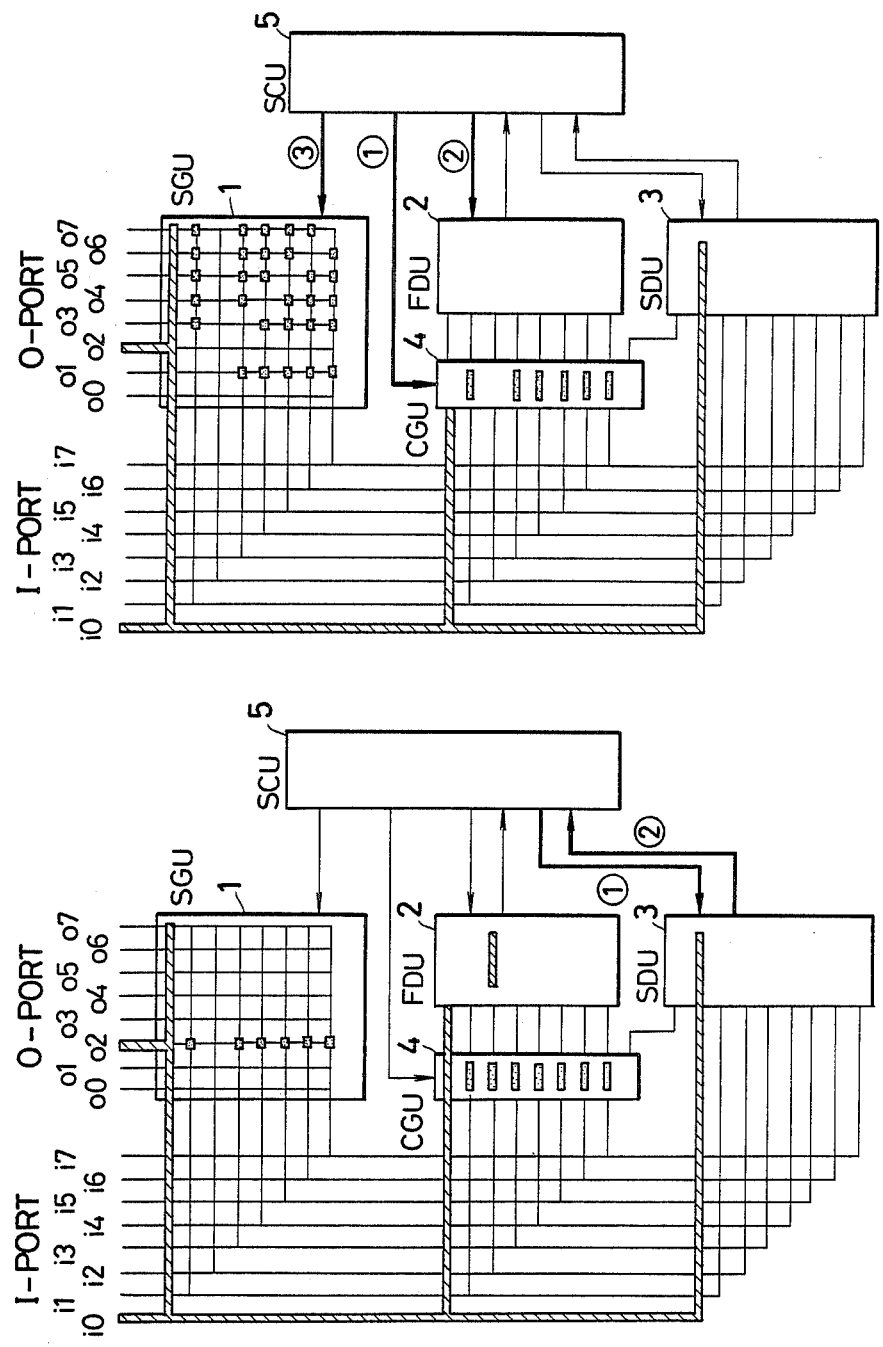

COMMUNICATION NETWORK CONTROL SYSTEM

BACKGROUND OF THE INVENTION

1. Field of the Invention

This invention relates to a control system of a communication network, and, in particular, to a control system of a local area network (LAN).

2. Description of the Prior Art

Typical prior art communication network control systems include (a) CSMA base-band LAN, (b) broadband LAN, and (c) TDMA base-band LAN in combination with digital PBX. The prior art also includes U.S. Pat. No. 4,516,272, "COMMUNICATION NETWORK", issued to the present applicant on May 7, 1985 and assigned to the assignee of this application, which is hereby incorporated by reference, Japanese Patent Laid-open Publication No. 57-104339, "OPTICAL COMMUNICATION NETWORK", invented by the present applicant and assigned to the assignee of this application, and Japanese patent application No. 58-139543, "COMMUNICATION NETWORK", invented by the present applicant and assigned to the assignee of this application. See, also, commonly assigned U.S. Pat. No. 4,707,828 and the prior art cited therein.

The above-mentioned (a) CSMA base-band LAN is suitable for the application in which packets are relatively short and transmitted sporadically as in the case of transmitting data information and textual information. However, in the case where a packet to be transmitted is of indefinite length, a packet is produced continuously, and/or real time processing is required, as in the case of a multi-media communication, the rate of collisions rises and this tends to inhibit high throughput. What is meant by multi-media communication in the field of LAN is that information to be transmitted includes not only data and text, but also image, voice and video in combination. The above-described (b) broadband LAN is difficult to apply to multi-media communication and it also has problems in cost and ability to expand. Although the above-described (c) TDMA (time division multiplex access) base-band LAN in combination with digital PBX is technically most suitable among the prior art for application in the field of multi-media communication, it still suffers from the problems in cost and limited ability to expand. In particular, when it is applied to multi-media communication, the cost can be prohibitive.

The prior inventions described in my above-mentioned prior patent and applications are most suitable for application in the field of multi-media communication in many respects. For example, the basic features of my earlier inventions commonly include (1) first-come-first-served logic, (2) multi-coupling structure, and (3) multi-input-single-output function. In a communication network having these features, when two or more signals are input into a single node of the network, the node allows only the first signal to pass therethrough based on the (1) first-come-first-served logic and (3) multi-input-single-output principle, though the node is connected to more than two other nodes or terminals according to the (2) multi-coupling concept.

In my prior inventions, a particular communication route must first be established prior to transmission of information. For this purpose, a source terminal having information to send first sends a call packet into the network constructed by a plurality of nodes interconnected according to the multi-coupling concept. The call packet is disseminated into the network as passing through nodes, and, upon receipt of this call packet by a destination terminal, a call-back packet is returned to the source terminal again passing through various nodes, thereby establishing a particular communication route between the source and destination terminals. In this manner, a packet must pass through a number of nodes, and, thus, a preamble or leading section of the packet is lost slightly every time when the packet passes through a node, thereby causing a propagation delay. This is disadvantageous because it takes longer to establish a particular transmission route, which, in turn, increases the rate of occurrence of packet collision.

In my prior communication networks, a plurality of transmission routes may be simultaneously established. However, since each node has the multi-input-single-output function, such a plurality of transmission routes to be established at the same time cannot have common nodes. In other words, in my prior networks, a plurality of simultaneously established transmission routes cannot extend crossing each other. This can be a limitation in increasing the use rate of a network system.

SUMMARY OF THE INVENTION

In accordance with the present invention, there is provided a control system of a communication network including a plurality of nodes which are connected by transmission means, which is structured to prevent a preamble or leading section of a packet from being lost when the packet passes through a node. This prevents the occurrence of propagation delay due to loss of preamble and helps establish a transmission route rapidly, which, in turn, enhances throughput when the packet is relatively short. For this purpose, in accordance with the preferred embodiment of the present invention, each node has a plurality of input channels, a plurality of output channels and connection control means for controlling the connection between the input and output channels, whereby, when one or more signals are input into one or more of the plurality of input channels, the connection control means once causes all of the signals to be supplied to all of the plurality of output channels excepting those already in use or excepting those already in use and that output channel which corresponds to the input channel having received one of the signals, detects an input channel which has first received the signal and disconnect the input channels from the output channels excepting the input channel having received the signal in the first place and those already in use.

In accordance with another aspect of the present invention, there is provided a communication network including a plurality of nodes which are connected by transmission means, and each of the nodes includes a plurality of input channels, a plurality of output channels and connection control means for controlling connection between the input and output channels within the node. In accordance with this aspect of the present invention, the connection control means of a node allows two or more input channels to be connected to two or more output channels at the same time, thereby allowing the node to be used a common node for two or more transmission paths simultaneously established in the communication network.

It is therefore a primary object of the present invention to obviate the disadvantages of the prior art as described above and to provide an improved communication network.

Another object of the present invention is to provide a communication network control system suitable for use in multi-media communication.

A further object of the present invention is to provide an improved control system of a communication network, in particular, LAN.

A still further object of the present invention is to provide a communication network control system capable of preventing the occurrence of propagation delay due to partial loss of preamble of a packet.

A still further object of the present invention is to provide a communication network control system capable of establishing a transmission route rapidly and having an increased throughput.

A still further object of the present invention is to provide a communication network having a plurality of nodes which are connected and at least one of which can be shared by two or more transmission routes simultaneously.

A still further object of the present invention is to provide an improved communication control having an enhanced use rate and high throughput.

Other objects, advantages and novel features of the present invention will become apparent from the following detailed description of the invention when considered in conjunction with the accompanying drawings.

BRIEF DESCRIPTION OF THE DRAWINGS

FIGS. 2a through 2h are schematic illustrations useful for understanding the operation of the structure shown in FIG. 1;

FIGS. 14a through 14h are schematic illustrations which are useful for understanding the operation of the structure shown in FIG. 13;

FIGS. 16a through 16k are schematic illustrations showing a sequence of steps in another embodiment modified from the structure shown in FIG. 13;

DESCRIPTION OF THE PREFERRED EMBODIMENTS

Figure 1:
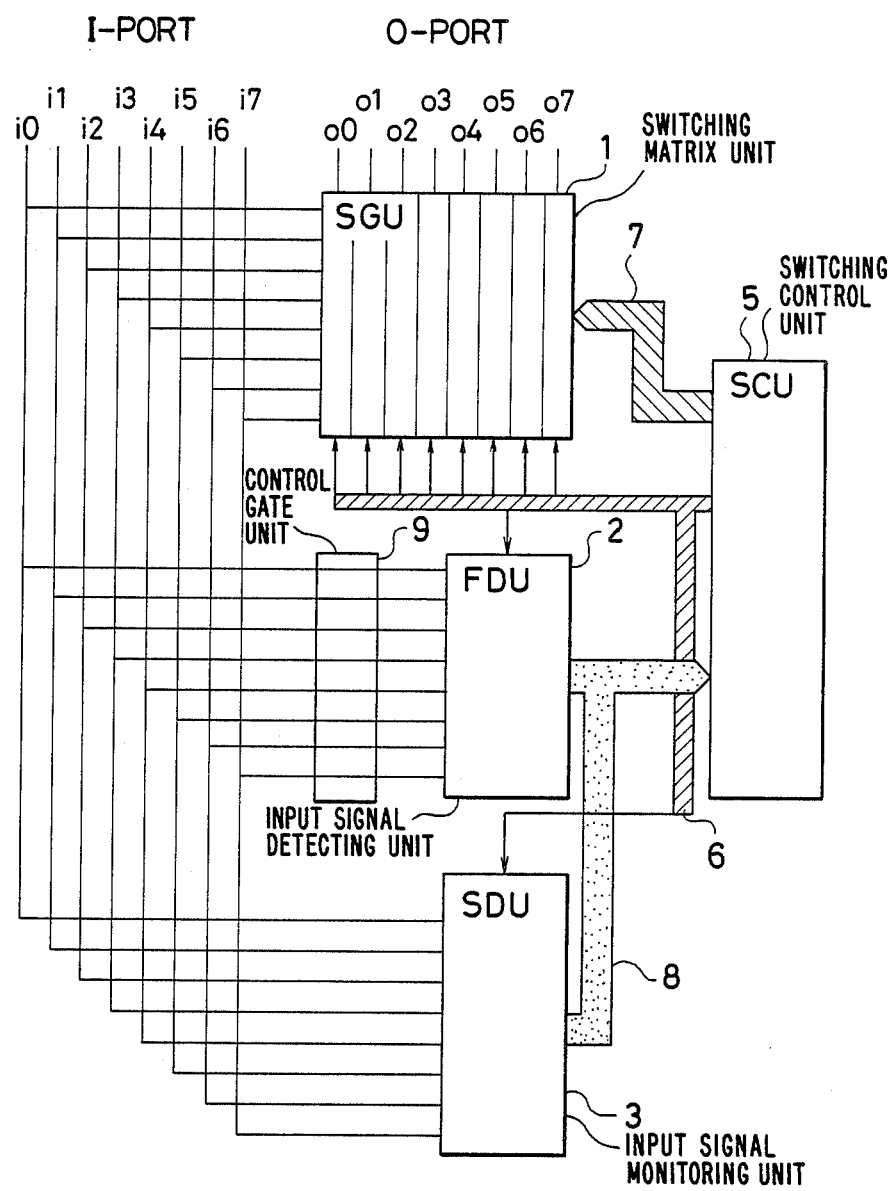
FIG. 1 is a schematic illustration showing the internal structure of a node for use in a communication network constructed in accordance with one embodiment of the present invention.
Figure 9:
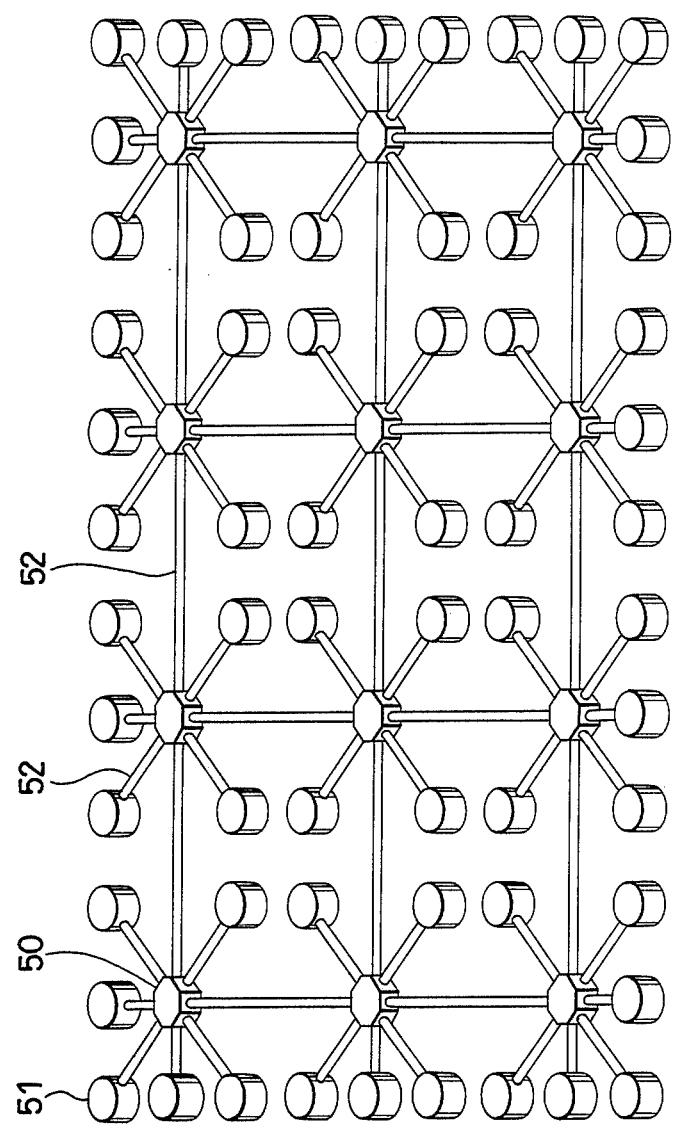
FIG. 9 is a schematic illustration showing a communication network including a plurality of nodes, to which the present invention may be advantageously applied.

Referring now to FIG. 1, there is schematically shown the internal structure of a node for use in a communication network constructed in accordance with one embodiment of the present invention. Such a network may have a structure as shown in FIG. 9, and it includes a plurality of nodes which are connected by transmission lines, and one or more of terminals are connected to selected ones of the nodes. As shown in FIG. 1, the illustrated node has a plurality (eight in the illustrated example) of input channels indicated as I-PORT, a plurality (eight in the illustrated example) of output channels indicated as O-PORT, and connection control means for controlling connection between the input and output channels. It is to be noted that each of the input channels is indicated by a small letter "i" followed by its channel number, and, similarly, each of the output channels is indicated by a small letter "o" followed by its channel number. In the illustrated embodiment, the connection control means includes a switching matrix unit (SGU) 1 interposed between the input and output channels, a first arrived input signal detecting unit (FDU) 2 for detecting which of the input channels has received the input signal in the first place based on the first-come-first-served basis, an input signal monitoring unit (SDU) 3 for constantly monitoring the presence and absence of input signal, a switching control unit (SCU) 5 for controlling the overall operation of the node, and a control gate unit 9.

As in my earlier inventions disclosed in the above-mentioned prior art, if the node is so structured that, when a packet signal is input, it is first detected which of the input channels has received the packet signal and then the packet signal is supplied to all of the output channels or all of the output channels excepting that output channel corresponding to the input channel which has received the packet signal, the preamble or leading section of the packet signal is lost partly over a time period until the supply of the packet signal to the output channels is initiated. The preamble is located at the leading end of the packet signal and it is used, for example, for synchronization, and no problem arises even if it is lost partly if its amount is small. However, a packet signal normally passes through a number of nodes until it reaches a destination terminal, and, thus, when added up, the total amount of preamble portion lost can be significant. Accordingly, the total delay time period due to partial loss of preamble can also be significant. With such a relatively large delay time period, there is an increased probability of packet collisions.

One aspect of the present invention is directed to eliminate or at least reduce the possibility of losing the preamble partially when the packet signal passes through each node of the communication network, thereby minimizing the delay time period and thus the occurrence of packet collisions.

Figure 2D:
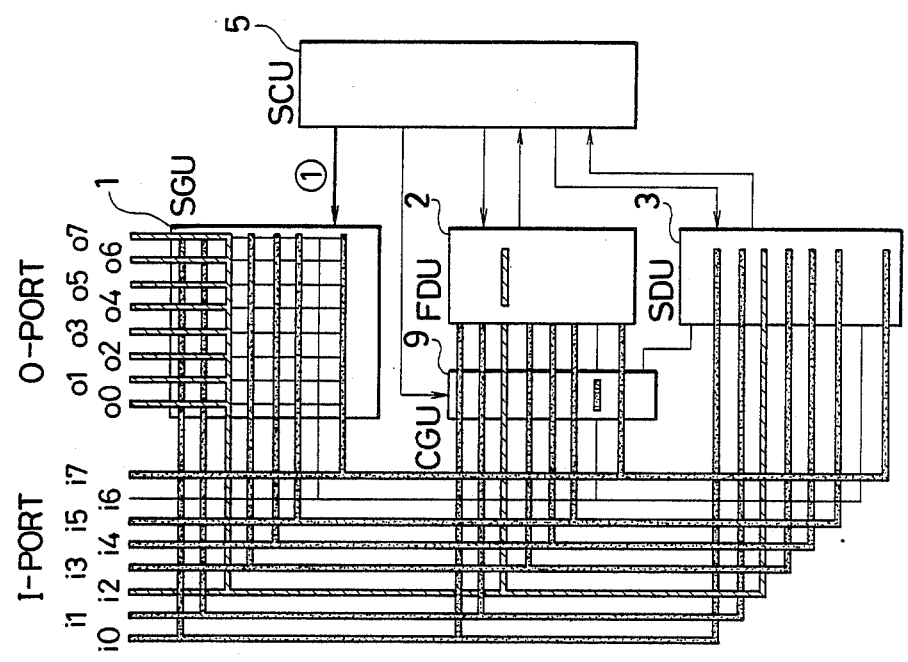

The typcial operation of the node shown in FIG. 1 will be described with reference to FIGS. 2a through 2h. In the first place, FIG. 2a shows an initial state in which each of the input channels i0 through i7 is connected to each of the output channels o0 through o7 via the switching matrix unit 1 in accordance with a control signal from the switching control unit 5. It is to be noted that, in the drawing, lines extending from and to the switching control unit 5 indicate control lines and they are shown as bold lines to indicate the presence of control signals thereon, as bold line indicated by 2 with a circle.

FIG. 2b shows a state when a signal is input into the node, and, in the present node, whenever a signal is input into one of the channels, the signal is output through all of the output channels. In the illustrated embodiment, a signal is input into an input channel i2, and, thus, the signal is automatically supplied to all of the output channels o1 through o7 through the switching matrix unit 1. At the same time, the signal input into the input channel i2 is also supplied into the first arrived input signal detecting unit 2 and to the input signal monitoring unit 3 through interconnection lines associated with the input channel i2.

Figure 2C:
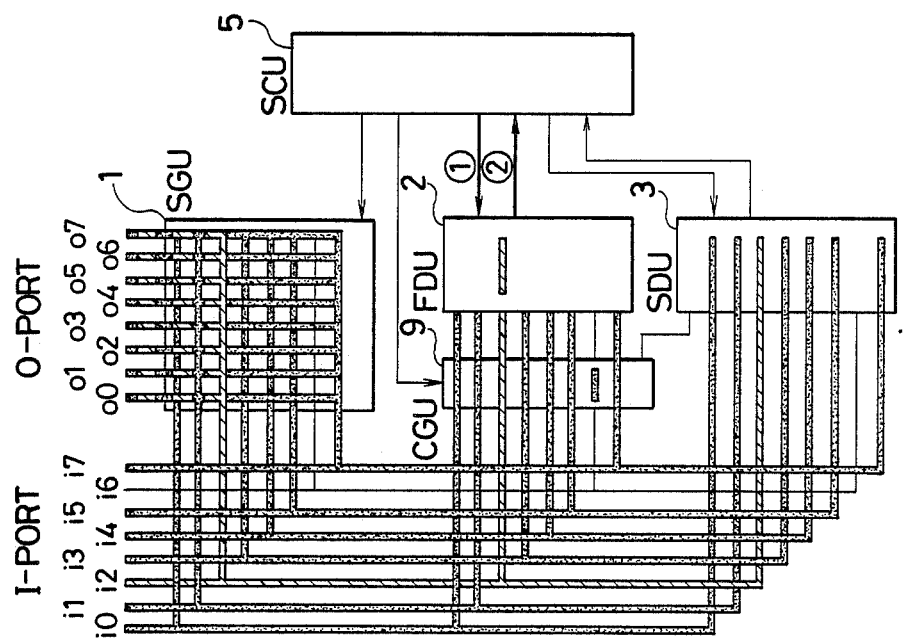

FIG. 2c shows how the first arrived input signal detecting unit 2 responds. That is, when the first arrived input signal detecting unit 2 has detected the fact that the input channel i2 is the first one to receive an input signal, the switching control unit 5 stores this fact through a control line indicated by 2 with a circle. Subsequently, if the other input channels also receive signals, all of these received signals are also supplied to all of the output channels o0 through o7. In the illustrated example, these subsequent signals are indicated by dotted lines. In this manner, the switching matrix unit 1 causes each of the signals input into any of the input channels i0 through i7 to be automatically output through all of the output channels o0 through o7. Thus, at this time, the output signals become mixed, and, of course, the input signals are also mixed.

FIG. 2d shows a state of causing all of the input channels to be disconnected from the output channels excepting that input channel which received the signal in the first place. That is, in accordance with a control signal from the switching control unit 5, all of the input channels i0, i1 and i3 through i7 excepting the input channel i2 are disconnected from all of the output channels o0 through o7 in the switching matrix unit 1. As a result, it is only the input channel i2 which remains to be connected to all of the output channels o0 through o7. That is, after having each of the input channels once output through all of the output channels, all of the input channels excepting that input channel which first received its input signal and thus stored in the switching control unit 5 are disconnected from all of the output channels. Accordingly, the leading section of the input signal, i.e., the preamble of a packet signal, is prevented from being lost partly, and, thus, no delay is produced.

Figure 2F:
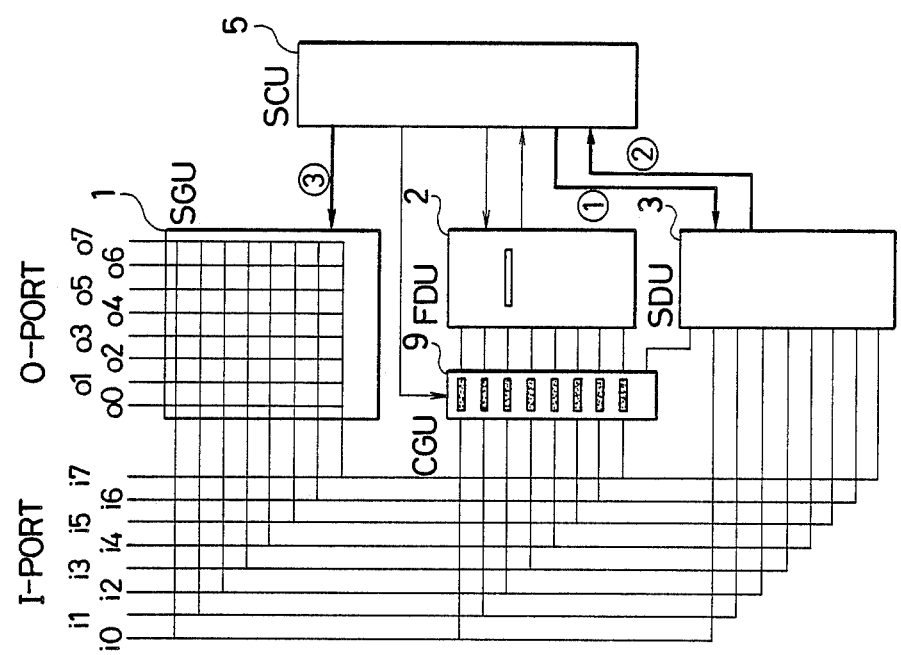
Figure 2E:
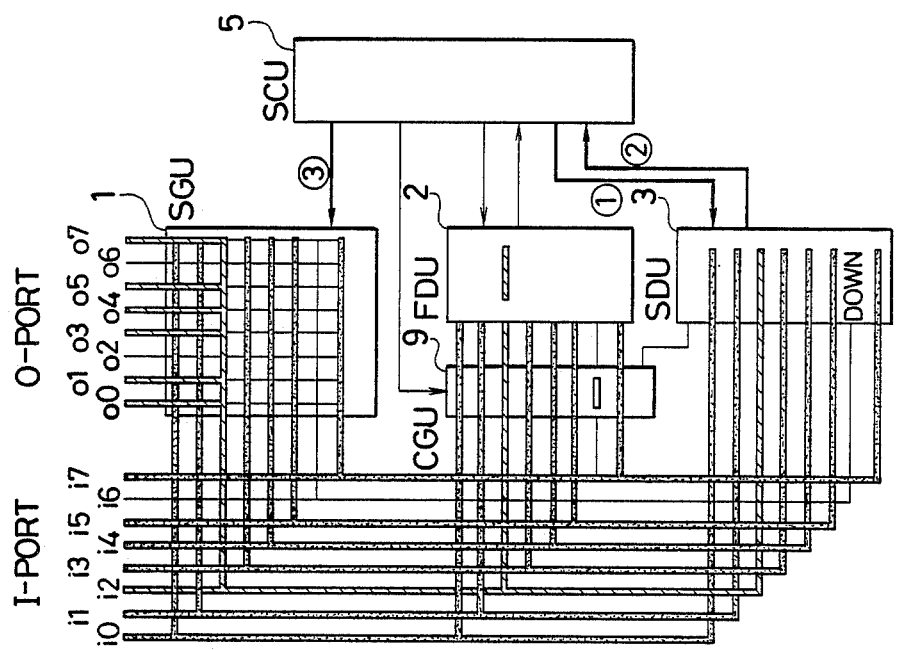

FIG. 2e shows another embodiment of the present invention which is so structured to prevent a signal from being transmitted back to a source terminal and also to a failed node or terminal. That is, each input channel forms a pair with an output channel having the same channel number and such a pair of input and output channels is connected to the same terminal. For example, input and output channels i2 and o2 form a pair and these are connected to a terminal #2. In this case, it is sometimes desirable that the signal transmitted from the terminal #2 to the node is not transmitted back to the terminal. In the structure shown in FIG. 2e, the switching control unit 5 examines the input signal monitoring unit 3 through control lines 1 with a circle and 2 with a circle to detect which input channel has received the input signal and then controls the switching matrix unit 1 through a control line 3 with a circle such that the input signal is not supplied to the corresponding output channel o2. In addition, if any of the pair of input and output channels is connected to a failed node or terminal, e.g., #6 terminal to which input and output channels i6 and o6 are connected being down, the switching control unit 5 controls the switching matrix unit 1 such that the input channel i2 is disconnected not only from the output channel o2 but also from the output channel o6. In this case, the input signal is prevented not only from being transmitted back to its source terminal, but also from being transmitted to a failed node or terminal.

FIG. 2f shows a state in which the supply of input signal has terminated. Upon detection of the termination of input signal, this fact is apprised to the switching control unit 5 by the input signal monitoring unit 3 through control lines 1 and 2 each with a circle. Then, the switching control unit 5 controls the switching matrix unit 1 through the control line 3 with a circle such that all of the input channels i0 through i7, or a set of input channels i0, i1 and i3 through i7, or another set of input channels i0, i1, i3 through i5 and i7 are connected to the output channel o2. That is, at each node, upon completion of passing of a first forward signal, or call packet, the direction of transmission is reversed from the condition that information is supplied internally from the input channel 2 to all of the other output channels to the condition that information now can be supplied internally from all of the other input channels to the output channel o2. In other words, after the call packet received at the input channel i2 has been output through all of the output channels excepting the corresponding output channel o2, the condition of the switching matrix unit 1 is automatically set by the switching control unit 5 such that a next signal received by any of the input channels excepting the input channel i2 is supplied to the output channel o2.

Figure 10:
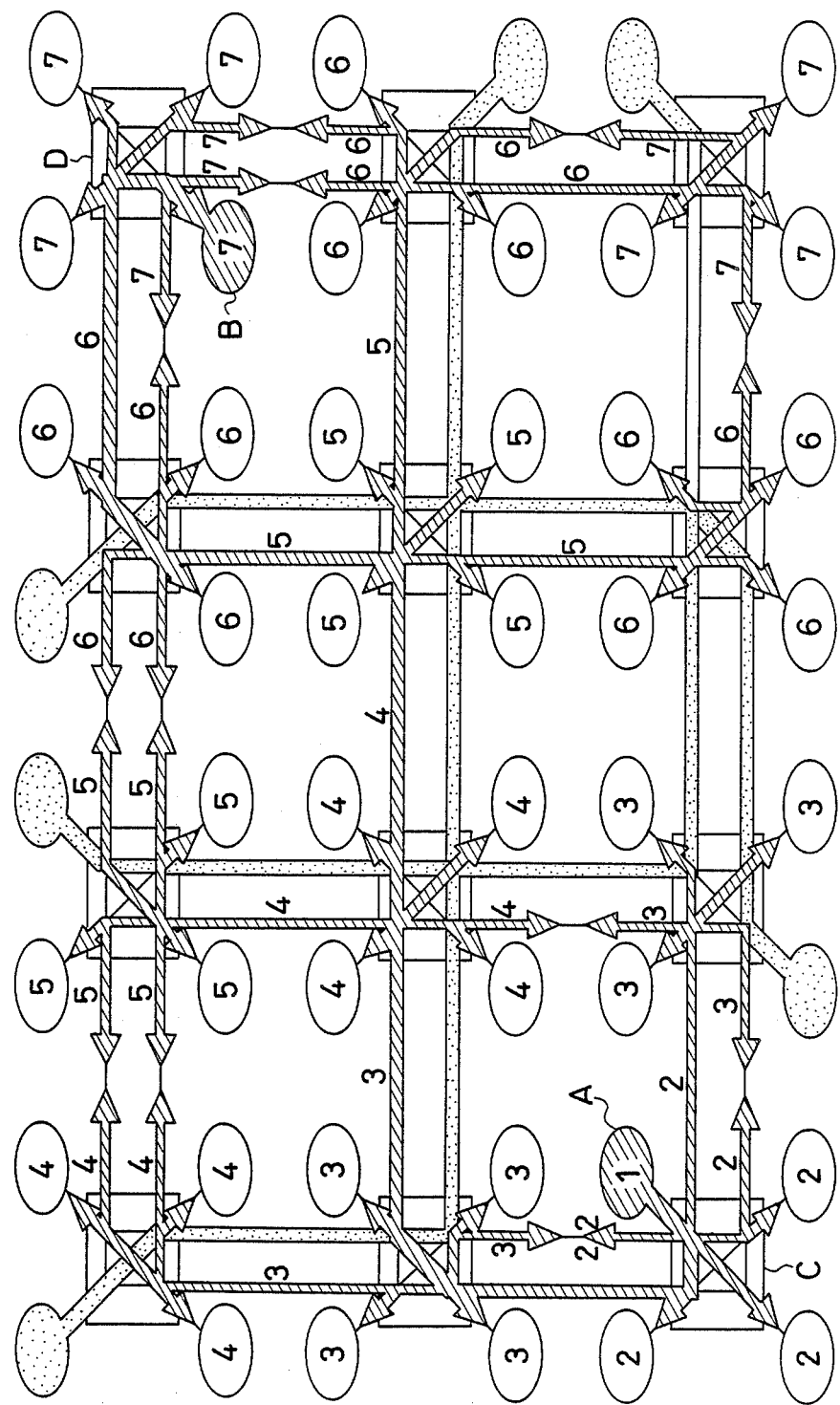
FIGS. 10 through 12 are schematic illustrations which are useful for understanding the operation of the communication network shown in FIG. 9.
Figure 11:
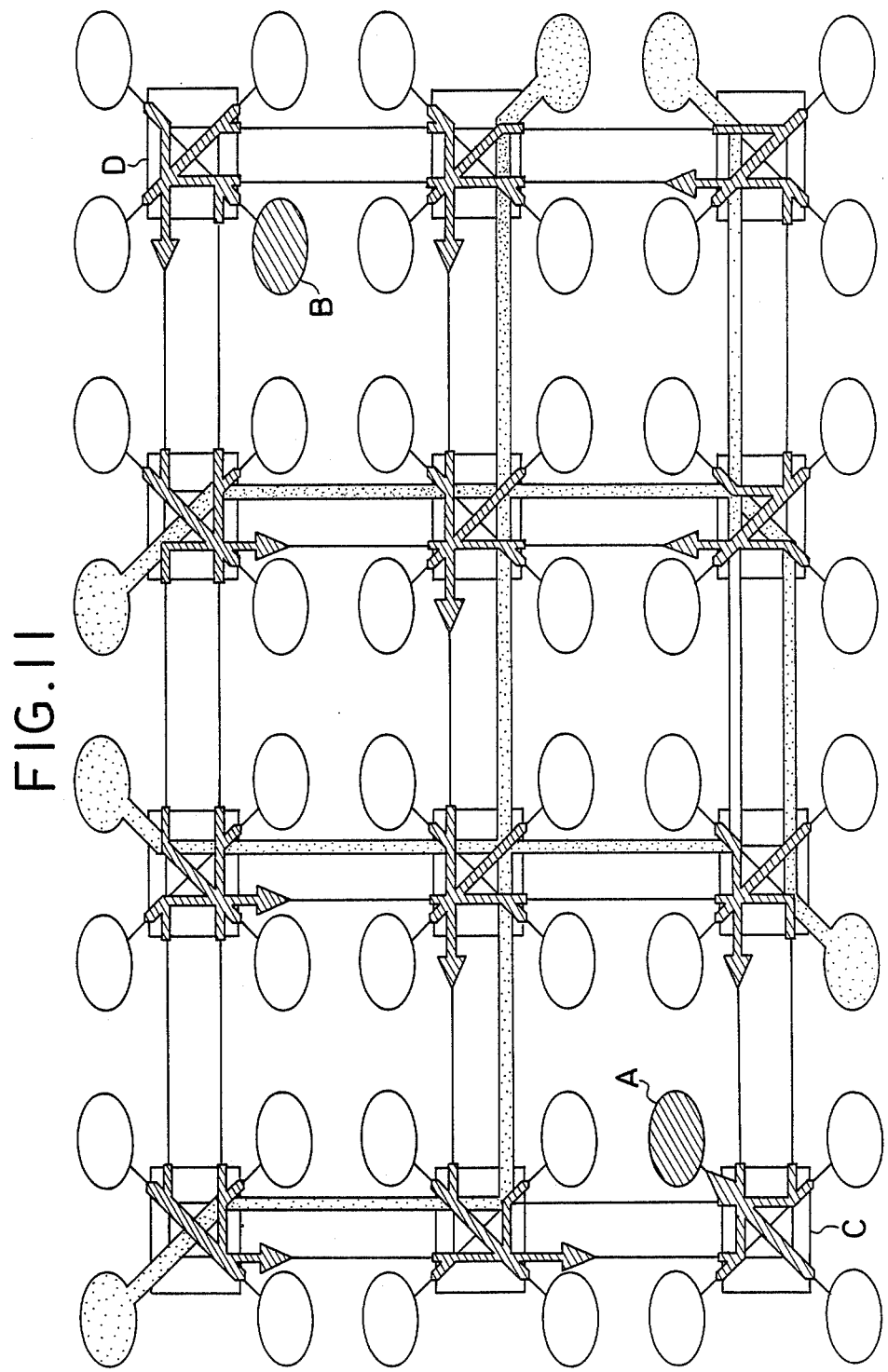
Figure 12:
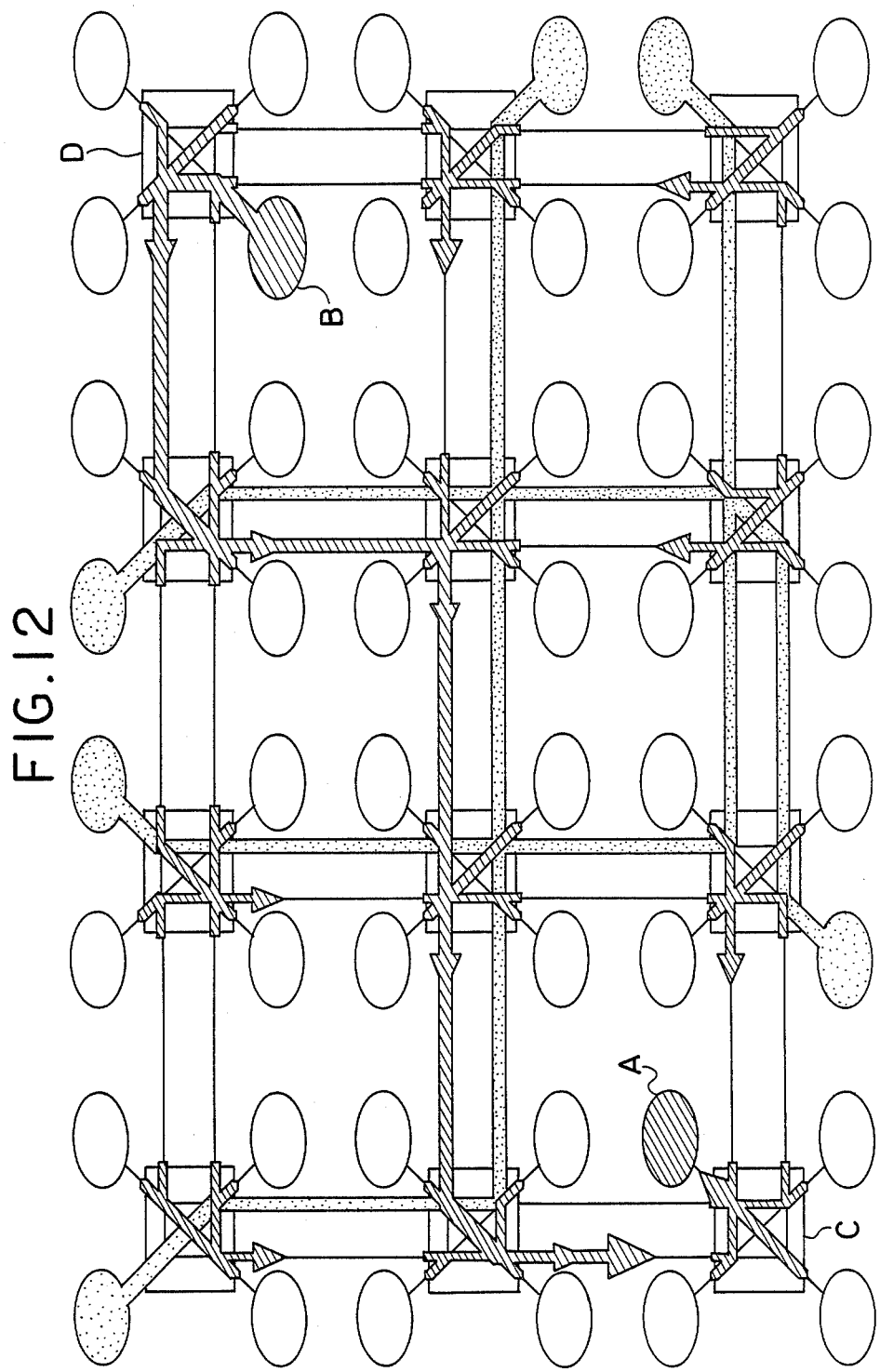

Such switching of direction of transmission at the node in the communication network architecture will be described more in detail with particular reference to FIGS. 10 through 12. In these figures, nodes are indicated by rectangles and terminals connected to the nodes are indicated by ellipses. As shown in FIG. 10, in cycle 1, a call packet originating from a source terminal A connected to a node C at bottom left is received by the other terminals which are connected to the same node C in cycle 2. And, the call packet is received by each of the terminals which are connected to the adjacent nodes connected to the node C in cycle 3. And, in cycle 4, the call packet is received by the terminals connected to the next adjacent nodes, and it is spread into the network gradually. Finally, the call packet is received by a destination terminal B connected to a node D at top left in cycle 7. FIG. 11 corresponds to the state shown in FIG. 2f and thus it shows the condition that each node has reversed its direction of transmission upon passing of the call packet. As a result, the directions of arrows in FIG. 11 are reversed as compared with those of FIG. 10. Thus, as shown in FIG. 12, when a call back packet is issued from the terminal B in response to the call packet just received, it is transmitted to the terminal A along the same route as but opposite in direction to the call packet, as shown in FIG. 12.

Figure 2H:
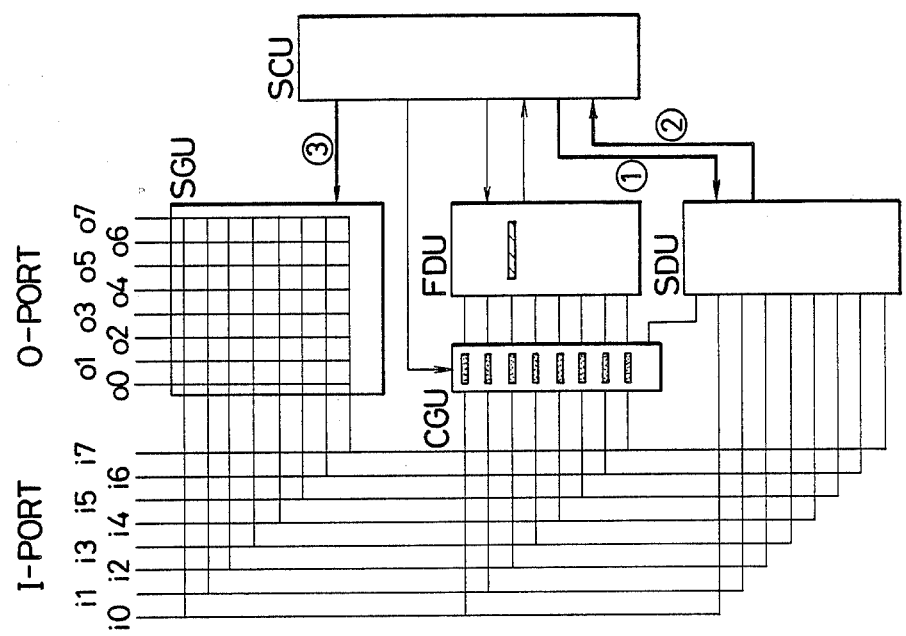
Figure 2G:
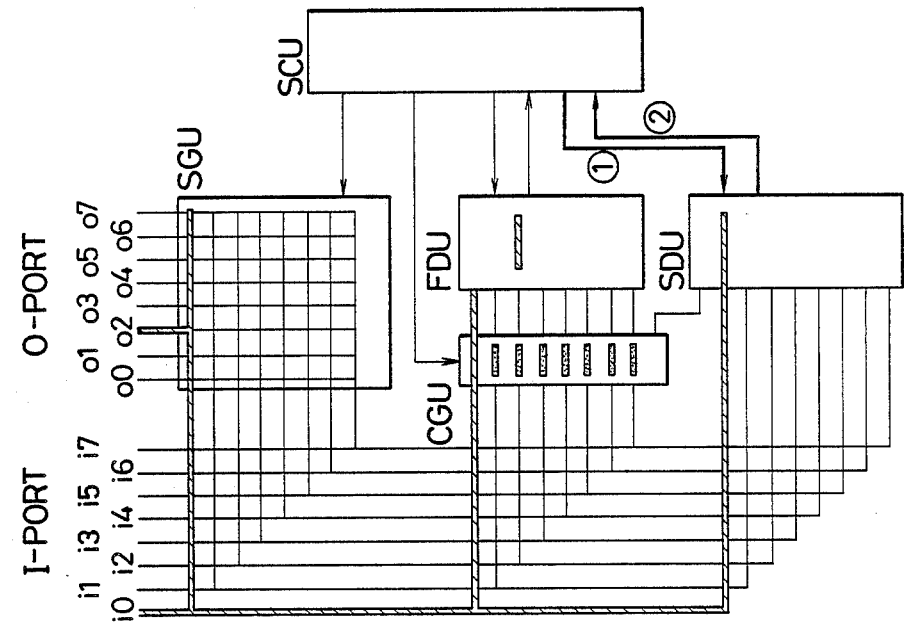

FIG. 2g shows a state in which the call back packet as first return information is input into the input channel i0 of the node. That is, if a signal, or call back packet in the present example, is input into any of the input channel (input channel i0 in the present example) within a predetermined time period $T_2$ as from the termination of the call packet, then the signal is output through the output channel o2. That is, when a signal is input into the input channel i0, the switching control unit 5 comes to know this fact by examining the input signal monitoring unit 3 through control lines 1 and 2 each with a circle and stores this fact. On the other hand, the switching matrix unit 1 is so set that a signal input into any of the input channels (input channel i0 in the present example) is automatically supplied to the output channel o2.

FIG. 2h shows a state ready for receiving a next signal, or message packet in the present example. When the input signal monitoring unit 3 detects the termination of the call back packet, the signal monitoring unit 3 apprises this fact to the switching control unit 5 through control lines 1 and 2 each with a circle. In response thereto, the switching control unit 5 controls the switching matrix unit 1 through control line 3 with a circle such that the input channel i2 is connected to the output channel o0. That is, since transmission was carried out from the input channel i0 to the output channel o2 in the previous cycle, the next path is established such that transmission takes place from the input channel i2 to the output channel o0 in the next cycle. When the message packet, or second forward information, is input, the operations shown in FIGS. 2g and 2h are again repeated. That is, the message packet as the second forward information is supplied from the input channel i2 to the output channel o0, and, then, an acknowledge packet as the second return information is supplied from the input channel i0 to the output channel o2. If no signal is input within the predetermined time period, then the node returns to its initial state shown in FIG. 2a.

FIGS. 3 through 7 show the detailed structures of some of the components shown in the node of FIG. 1. In the case of an eight channel node having eight pairs of input and output channels, the switching matrix unit 1 is comprised of eight modules separate for individual output channels, and each of the first arrived input signal detecting unit 2 and the input signal monitoring unit 3 is comprised of a single module. The switching control unit 5 is connected to these modules through a module select bus 6, a gate set bus 7 and a data bus (module output signal lines) 8.

Figure 3:
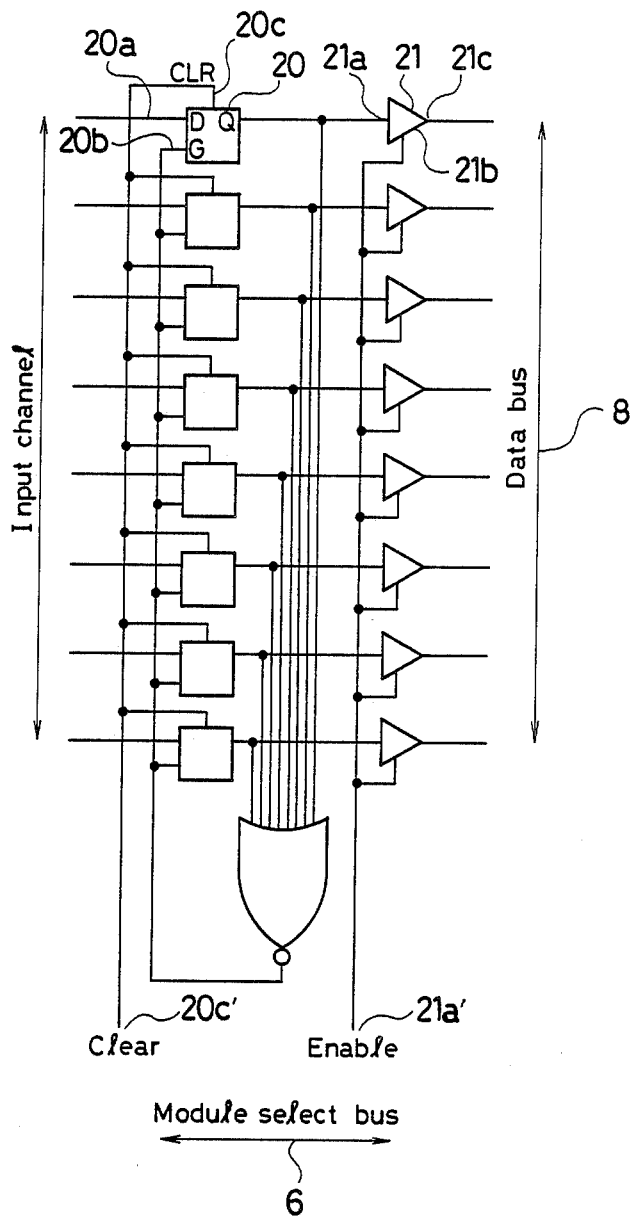
FIG. 3 is a schematic illustration showing the structure of a first arrived input signal detecting unit provided in the node of FIG. 1.
Figure 4:
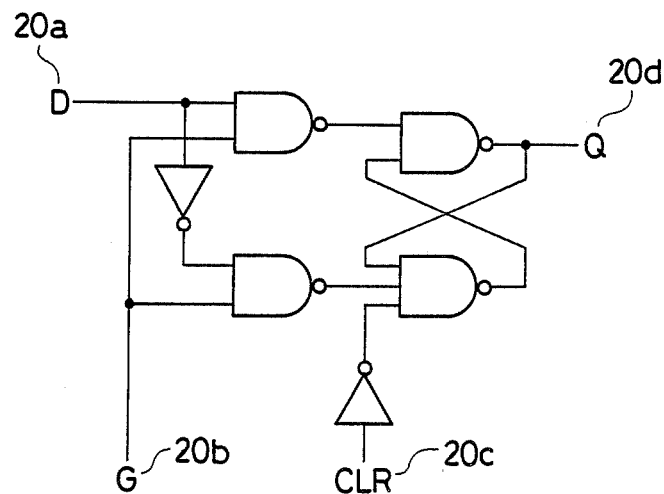
FIG. 4 is a logic diagram showing the structure of a latch for use in the unit of FIG. 3.

FIG. 3 shows the detailed structure of the first arrived signal detecting unit 2 provided in the node of FIG. 1 and FIG. 4 shows a logic circuit of each latch employed in the structure shown in FIG. 3. Since the present node is an eight channel device, the first arrived signal detecting unit 2 includes eight latches 20 and eight second-stage gates 21. Each of the latches 20 is provided with a D terminal, G terminal, CLR terminal and Q terminal. When a signal 20a is input into any of the latches 20 at the D terminal, the other latches 20 are rendered off by a signal 20b from the G terminal, and only the latch 20 having received the signal 20a supplies its output 20d from its Q terminal to the associated gate 21. With this structure, it can detect which of the input channels has received an input signal in the first place. When a clear signal 20c is applied to the CLR terminal of the latch 20, the unit is initialized. The D terminals of the latches 20 are connected to the respective input channels at the I-PORT, and the CLR terminals are commonly connected and also connected to a module select bus 6. Each of the Q terminals is connected to an input terminal 21a of an associated gate 21, which is one of two input terminals possessed by the gate 21. The remaining input terminals 21b of the gate 21 is connected to a common enable line 21a' which is connected to the module select bus 5. And, each of the gates 21 has its output terminal 21c connected to a data bus (module output signal line) 8.

As shown in FIG. 4, each of the latches 20 is comprised of a first pair of NAND gates having a switching function and a second pair of NAND gates having a memory function. It is to be noted, however, that the structure of the input signal monitoring unit 3 should not be limited only to that shown in FIGS. 3 and 4, but various other alternative structures are possible according to different design concepts. The difference mainly stems from the ratio between hardware and software in carrying out the above-described control operation. In the present embodiment, since the switching control unit 5 of FIG. 1 is formed by a microprocessor, the control on this part of the node relies on software, and corresponding thereto, the switching matrix unit 1 and the first arrived input signal detecting unit 2 are made functionally independent. If these units 1 and 2 are to be controlled solely by hardware, they must have an integrated structure which cannot be separated functionally.

Figure 6:
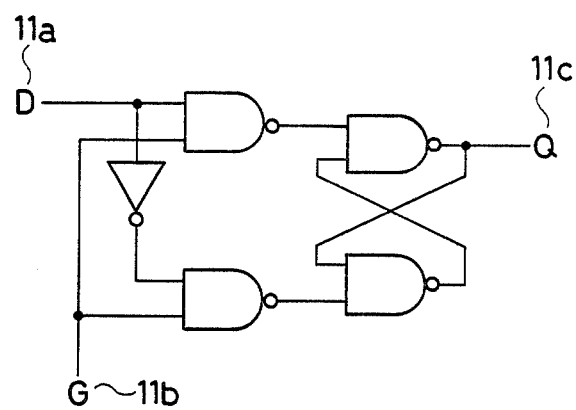
FIG. 6 is a logic diagram showing the structure of a latch for use in the switching matrix unit of FIG. 5.
Figure 5:
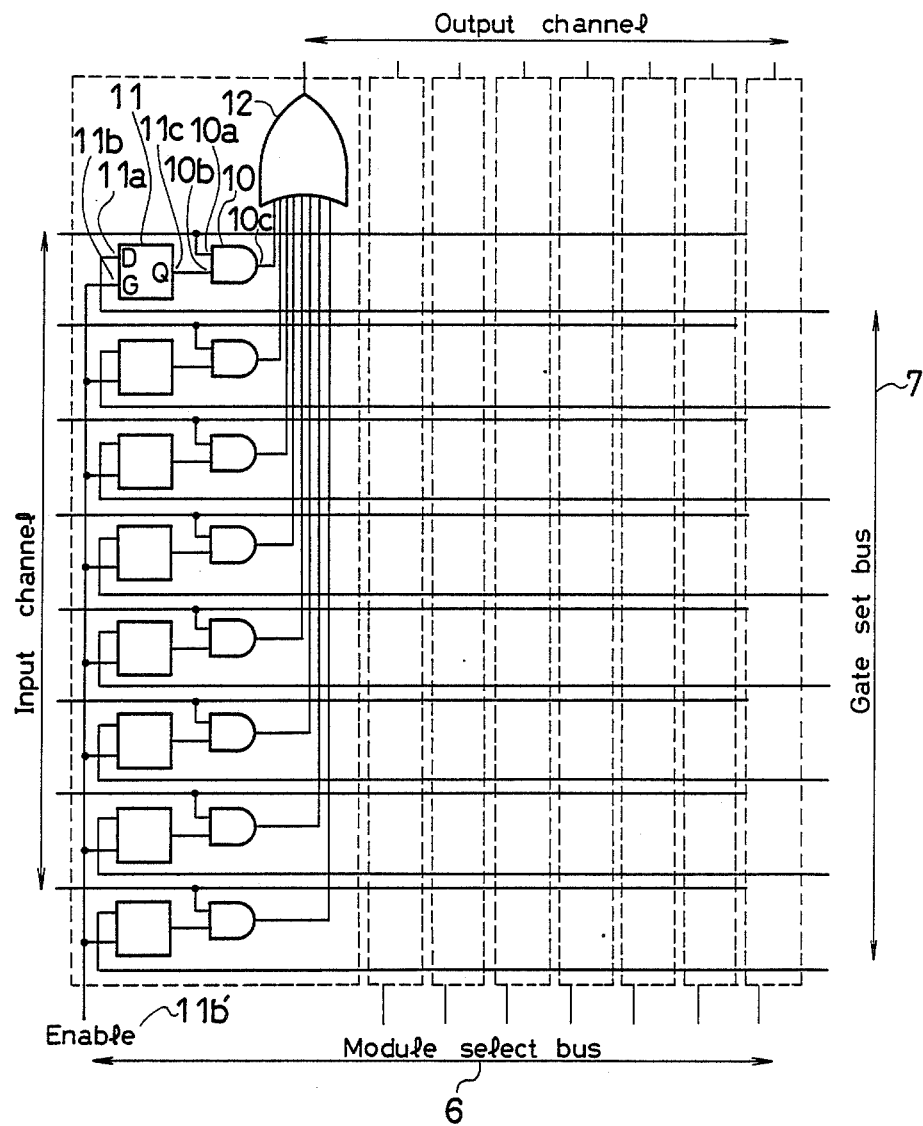
FIG. 5 is a schematic illustration showing the structure of a switching matrix unit provided in the node of FIG. 1.

FIG. 5 schematically shows the detailed structure of the switching matrix unit 1 provided in the node of FIG. 1. As shown, the switching matrix unit 1 includes eight modules separate for individual output channels, and each of these modules includes eight switching gates 10, eight latches 11 connected to respective switching gates 10, and an 8-input OR gate 12 to which the eight switching gates 10 are connected. It is to be noted that, in FIG. 5, only one of the eight modules is shown in detail, but the other modules have the same structure. Each module shares eight input signal lines from the I-PORT and a module select bus 6. Each of the latches 11 has its D terminal 11a connected to a gate set bus 7 and its Q terminal 11c connected to an input terminal 10b of the associated switching gate 10. The latch 11 also has a G terminal 11b which is connected to a common enable line 11b' which, in turn, is connected to the module select bus 6. Each of the switching gates 10 has its input terminal 10a connected to its associated input signal line and its output terminal 10c connected to an associated input terminal of the 8-input OR gate 12. With this structure, the latch 11 having a signal on its module select bus 6 and also on its gate set bus 7 is set, thereby causing its associated switching gate 10 to be open, so that, when a signal is input, it can be supplied to the output channel of its module through the OR gate 12. FIG. 6 is a logic diagram showing the detailed structure of the latch 11 employed in the structure of FIG. 5.

Similarly with the latch 20 in FIG. 20, the latch 11 forming part of the switching matrix unit 1 is also comprised of a first pair of NAND gates having a switching function and a second pair of NAND gates having a memory function.

Figure 7:
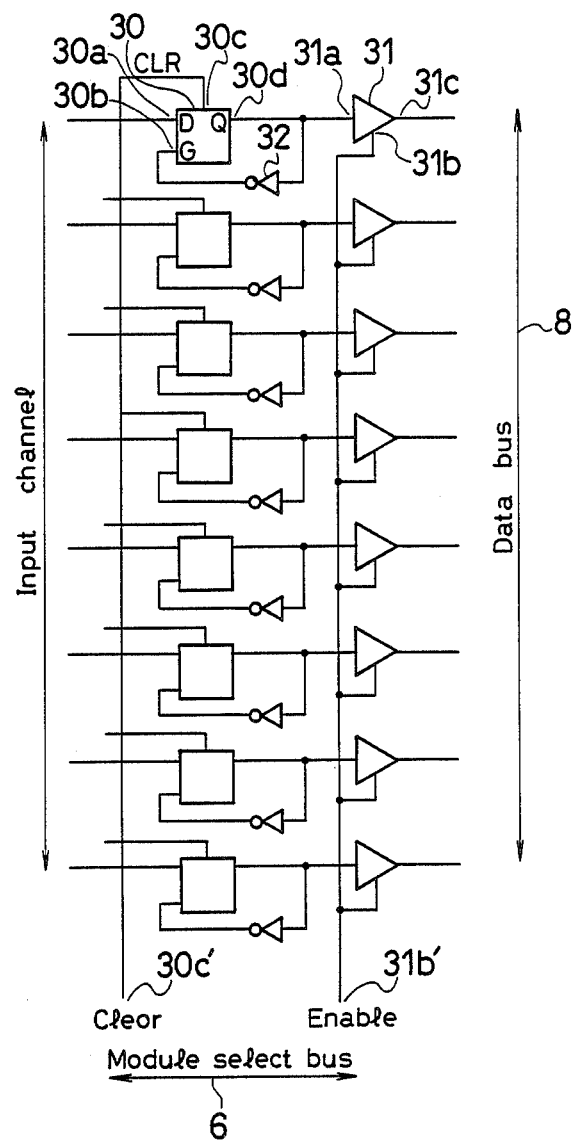
FIG. 7 is a schematic illustration showing an input signal monitoring unit provided in the node of FIG. 1.

Now, the detailed structure of the input signal monitoring unit 3 will be described with reference to FIG. 7. Since the present node is an eight channel device, the input signal monitoring unit 3 includes eight latches 30 and eight second-stage gates 31. Each of the latches 30 has its D terminal 30a connected to its corresponding input channel at the I-PORT and its Q terminal 30d connected to its G terminal 30b through an individual inverter 32 and also to an input terminal 31a of its associated gate 31. Each of the gates 31 has its output terminal 31c connected to a data bus 8. Besides, each of the latches 30 has its CLR terminal 30c connected to a common clear line 30c' which is connected to the module select bus 6. Each of the gates 31 has another input terminal 31b which is connected to a common enable line 31b' which, in turn, is connected to the module select bus 6. With this structure, if no signal is present at the associated input channel, since signal "1" is input to the G terminal of the latch 30, the latch 30 corresponding to an input channel having received an input signal is set. While the enable line 31b' is in an enabled state, the gates 31 are kept open, so that the input signal is output to the data bus 8, whereby the input channel having received the input signal is detected.

On the other hand, the switching control unit 5 selects one of the eight modules of the switching matrix unit 1 by means of the module select bus 6 and establishes the connection condition of the gates by means of the gate set bus 7. In addition, the switching control unit 5 reads status or information from the first arrived input signal detecting unit 2 and the input signal monitoring unit 3 by means of the module select bus 6, and, thereafter, clears the latch after read out.

Figure 8:
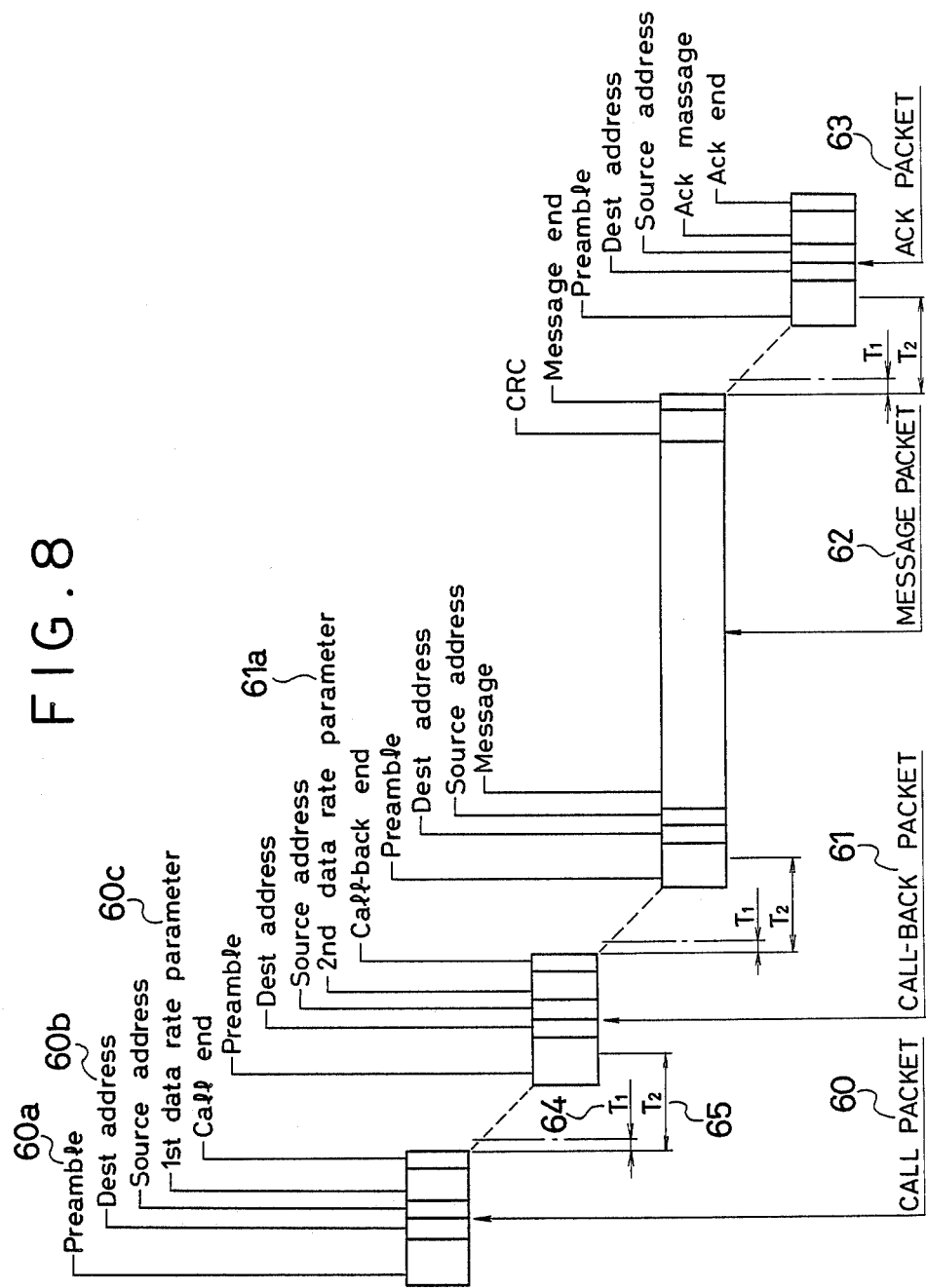
FIG. 8 is a schematic illustration showing a set of packets which may be advantageously used in the present communication network.

FIG. 8 illustrates a set of packet signals which can be advantageously used in a communication network embodying the present invention. Constraints of communication procedure required for source and destination terminals are as follows:

(a) First forward information (call packet) 60 should include a preamble 60a having a predetermined time length or more and a destination address 60b of a destination terminal to which information is to be sent.

(b) After elapsing a predetermined time period T1 64 upon completion of reception by a destination terminal of the first forward information (call packet) 60 addressed thereto, the destination terminal transmits first return information (call back packet) 61. The first predetermined time period T1 64 is a time period necessary for the connection control means of a node to carry out control for inputting of the first return information (call back packet), and this will be referred to as node time constant.

(c) When a terminal has received information not addressed thereto (only first forward information 60 is received), the terminal should not transmit any information within a second time period T2 65 upon termination of the reception of the information. The second predetermined time period T2 65 is a time period necessary for a packet to be disseminated into the network, and this is referred to as network time constant. With the provision of this second time period T2, a node closest to the source terminal is insured that the first return information (call back packet) 61 may be input within the second predetermined time period T2 65 upon termination of the first forward information (call packet) 60.

Since the above-described communication procedure can provide a high degree of freedom, the following advantages may be obtained.

(i) There is no limit for the length of shortest or longest packet. That is, a packet may be as short or long as desired.

(ii) There is no limit for the number of successive repetitions of forward and return information, and, thus, a particular channel can be monopolized.

(iii) The maximum data rate is determined by the hardware constructing the network; however, the data rate between source and destination terminals can be determined arbitrarily as long as it is below the maximum data rate.

A set of packets illustrated in FIG. 8 is a most typical set of packets used in a communication network, and it includes two forward information and two return information. The first forward information (call packet) 60 and the first return information (call back packet) 61 are used to establish a transmission path or route between the source and destination terminals in the network. Thus, neither of these packets contains a message. The second forward information (message packet) 62 is a packet containing a message, and since a particular transmission path is already established prior to transmission of this packet, there is virtually no constraints as to the form of a packet. The second return information (ACK packet) 63 is a packet to be used for acknowledging the safe receipt of the message by the destination terminal to the source terminal. If the message has not been correctly received, then this packet may be used to request retransmission of the message to the source terminal. It is to be noted that the present invention should not be viewed to the exclusive use of this set of packet signals shown in FIG. 8; instead, any set of packet signals may be used in the present invention as long as it meets the above-described three constraints of communication procedure.

In the case of a set of packet signals shown in FIG. 8, the first forward information (call packet) 60 and the first return information (call back packet) 61 contain a first data rate parameter 60c and a second data rate parameter 61a, respectively. At the source terminal, one or more of data rates desired to be used are written in the first data parameter section 60c. At the destination terminal, upon receipt of the call packet 60, one of the data rates contained in the first data parameter section 60c of the call packet 60 is chosen and it is written into the second data rate parameter section 61a of the call back packet 61. Thereafter, the transmission is carried out at this selected data rate. As an alternative, the first data rate parameter section 60c of the call packet 60 contains only one selected data rate, and the second data rate parameter section 61a of the call back packet 61 contains a data which indicates agreement or disagreement with the selected data rate contained in the first data rate parameter section 60c. As a further alternative, the second data rate parameter section 61a may be omitted entirely.

FIG. 9 shows a network structure which may be constructed in accordance with the present invention. The network to be constructed in accordance with the present invention may take the form, such as linear, star, loop, two-dimensional grid including nodes 50, terminals 51 connected to the nodes 50 and transmission lines interconnecting the nodes 50 or the terminals 51 to associated ones of the nodes 50, three-dimensional grid, or a combination of two or more of these. It should also be noted that two or more transmission lines 52 may be used between two nodes 50 or between a node 50 and a terminal 51. It should be understood that each of the transmission lines 52 must be bidirectional irrespective of the number of physical lines contained therein.

Figure 17A:
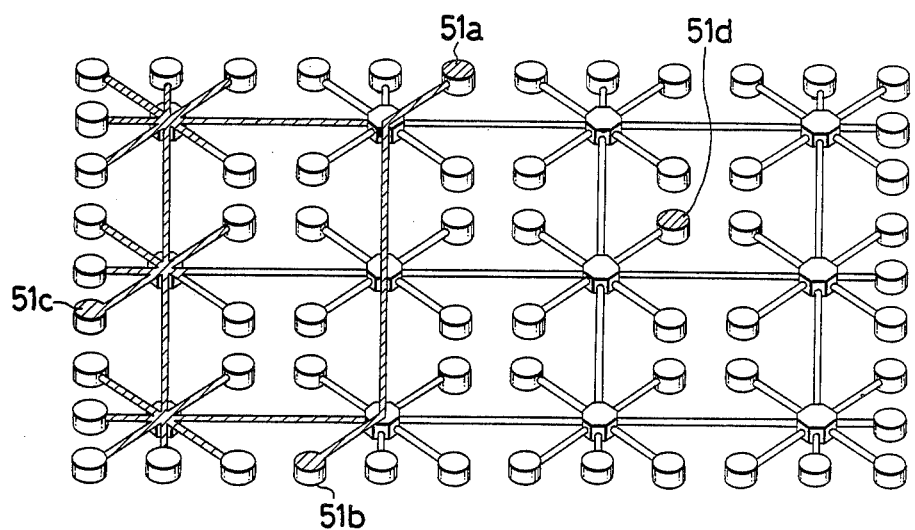
FIGS. 17a and 17b are schematic illustrations useful for explaining the difference between a network having no node sharing function and a network having node sharing function.

Now, another aspect of the present invention in which the network includes a node which can be commonly used to establish two or more transmission routes will be described. In the case where a communication network is comprised of a node which can be used only for single communication as shown in FIG. 17a, if a transmission route is established between two terminals 51a and 51b as indicated by the shaded line, then the entire network is divided into left and right sections and no transmission route can be established crossing the transmission route established between the terminals 51a and 51b. Thus, even if a terminal 51c has information to send to a terminal 51d, a transmission route between these terminals 51c and 51d can be established only after completion of communication between the terminals 51a and 51b. This aspect of the present invention is directed to solve such a problem by providing a node which can be used for two or more simultaneous communications.

Figure 17B:
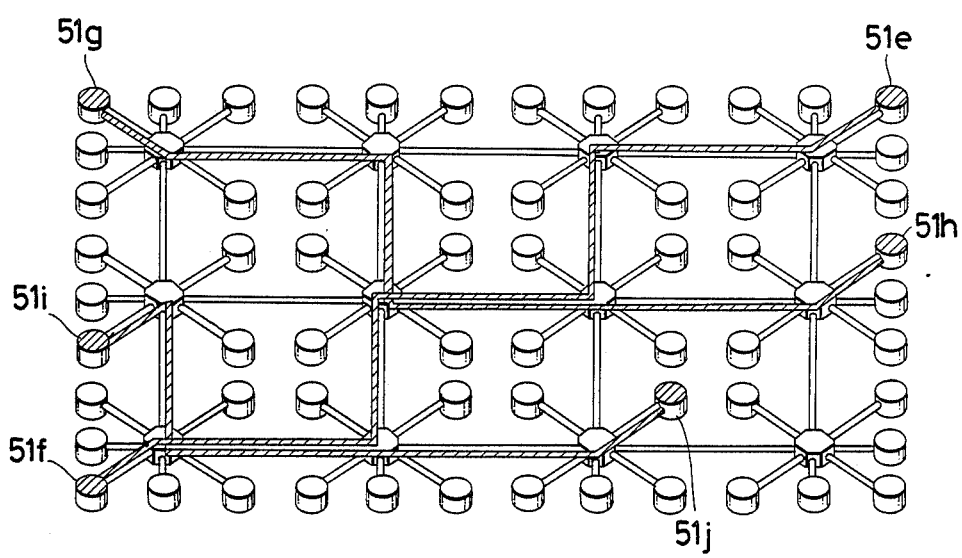

FIG. 17b schematically shows a communication network constructed in accordance with this aspect of the present invention, in which each node has a capability of handling two or more communications at the same time. With this structure, a transmission route may be established between any two terminals even if two or more transmission routes have already been established and currently in use. For example, a transmission route may be established simultaneously between terminals 51g and 51h, 51i and 51j, and 51f and 51e. In this case, four nodes are commonly used for handling two communications at the same time. With this structure, since the network is not divided, any desired number of transmission routes can be established at the same time, thereby enhancing the use rate of the network.

Figure 13:
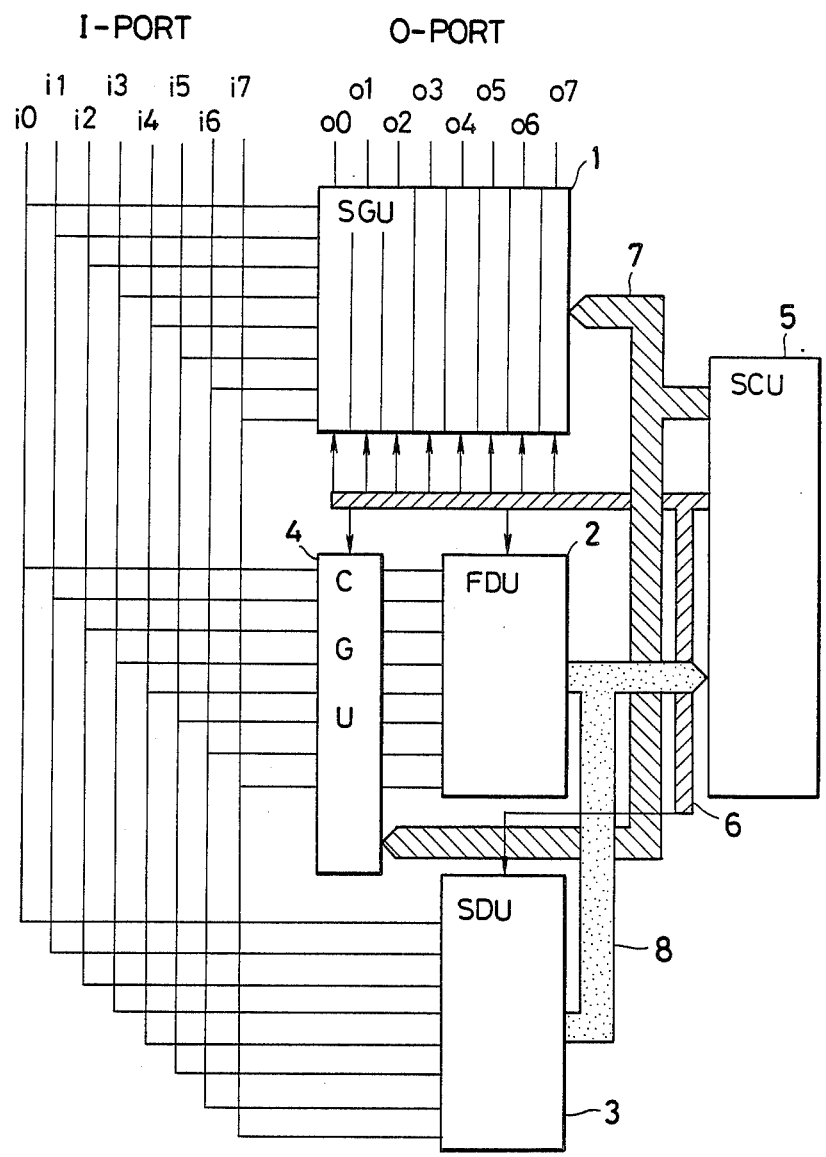
FIG. 13 is a schematic illustration showing the interanl structure of a node constructed in accordance with another embodiment of the present invention so as to be capable of being shared by two or more simultaneous transmission paths.

FIG. 13 schematically shows the internal structure of a node having the multi-communication handling capability constructed in accordance with one embodiment of this aspect of the present invention. As shown, the overall structure is similar to that of the node shown in FIG. 1, so that identical elements are indicated by identical numerals and characters. As shown, the present node includes a plurality (eight in the illustrated example) of input channels i0 through i7, which define an input port I-PORT, a like plurality of output channels o0 through o7, which define an output port O-PORT, and connection control means for controlling connection between the input and output channels. The connection control means includes a switching matrix unit 1 interposed between the I-PORT and O-PORT, a first arrived input signal detecting unit 2 for detecting an input channel having received an input signal in the first place on the first-come-first-served basis, an input signal monitoring unit 3 for constantly monitoring the presence and absence of an input signal, a control gate unit 4 for connecting any of the input channels to the first arrived input signal detecting unit 2, and a switching control unit 5 for controlling the overall operation of the node. Similarly with the previous embodiments, the switching matrix unit 1 is comprised of eight modules divided according to individual output channels, and the first arrived input signal detecting unit 2, the input signal monitoring unit 3 and the control gate unit 4 are comprised of a single module. The switching control unit 5 is connected to these modules through a module select bus 6, a gate set bus 7 and a data bus (module output signal line) 8. That is, the switching control unit 5 receives information from the first arrived input signal detecting unit 2 and also from the input signal monitoring unit 3 through the data bus 8, and selects each module of the switching matrix unit 1 through the module select bus 6, while controlling the first arrived input signal detecting unit 2 and the input signal monitoring unit 3 and also controlling the switching matrix unit 1 and the control gate 4 through the gate set bus 7.

Figure 14B:
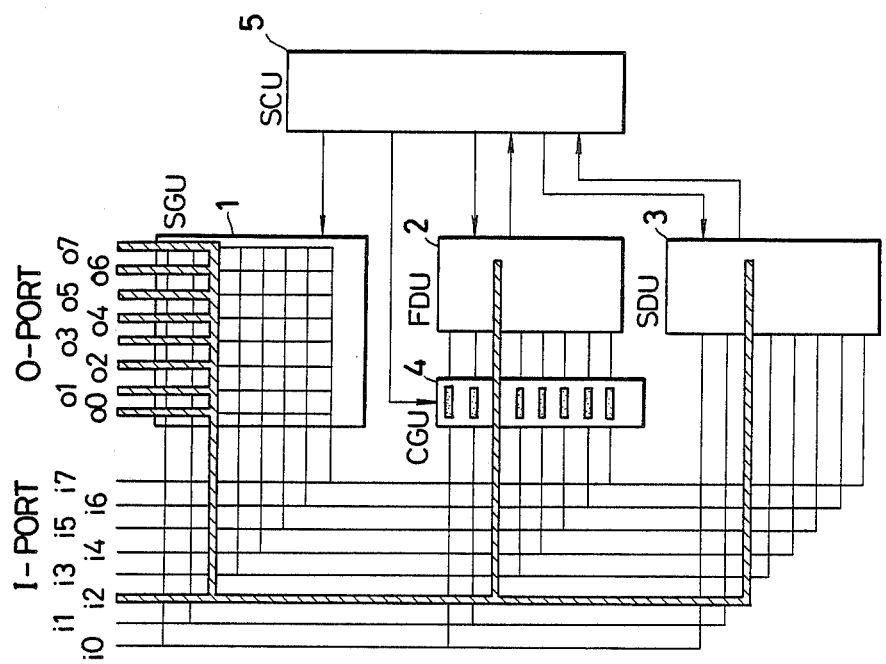
Figure 14A:
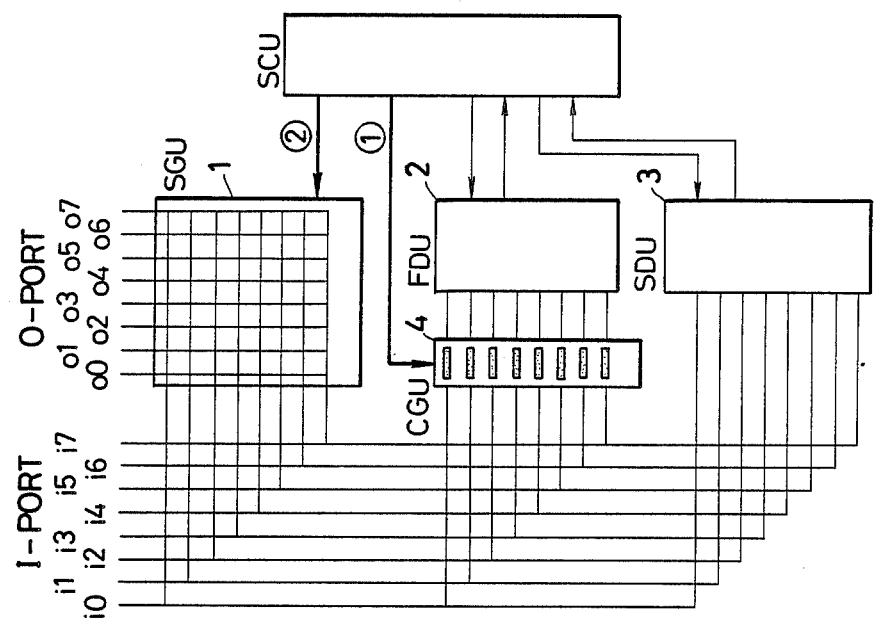

The operation of the node shown in FIG. 13 and having the above-described structure will be described with reference to FIGS. 14a through 14h. FIG. 14a shows an initial state of the node, in which the switching control unit 5 supplies a control signal 1 with a circle to the control gate 4 thereby causing all of the input channels i0 through i7 to be connected to the first arrived input signal detecting unit 2 and supplies another control signal 2 with a circle to the switching matrix unit 1 so that all of the input channels i0 through i7 are connected to respective output channels o0 through o7. FIG. 14b shows an state when a input signal is input into the input channel i2. As shown, the input signal is supplied to all of the output channel o0 through o7 from the input channel i2. On the other hand, the input signal is also supplied to the control gate 4 from the input channel i2 and further to the first arrived input signal detecting unit 2. This input signal is also supplied to the input signal monitoring unit 3.

FIG. 14c shows a state in which input signals are also input into the other input channels. The first arrived input signal detecting unit 2 detects the fact that an input signal has been input into the input channel i2 in the first place, and this fact is read and stored into a first memory position of the switching control unit 5 through control signals 1 and 2 each with a circle. Thereafter, if there is another input signal input into one of the other input channels, it is also supplied to and output through all of the output channels o0 through o7. At this time, the output signals become mixed and, of course, the input signals are also mixed. FIG. 14d shows a condition in which all of the output channels excepting that output channel which has received the input signal in the first place are disconnected from the input channels. That is, in response to a control signal 1 with a circle supplied from the switching control unit 5, all of the input channels excepting i2 are disconnected from the output channels o0 through o7. Thus, only the input channel i2 remains to be connected to the output channels o0 through o7.

FIG. 14e shows a modification of the operation shown in FIG. 14d. In this case, it is so structured that the first input signal is supplied to all of the output channels excepting its corresponding output channel and/or excepting those output channels which are connected to failed or malfunctioning terminals. That is, in the illustrated example, the switching control unit 5 controls such that the input signal received at the input channel i2 in the first place is not supplied to its corresponding output channel o2 because the supply of the input signal from the input channel i2 to the output channel o2 indicates returning the input signal to the terminal from which the input signal has come, and, thus, this is only good for confirmation and nothing else. In addition, the switching control unit 5 controls such that the input signal from the input channel i2 is not supplied to the output channel o6 because this output channel is connected to a terminal which is failed, malfunctioning or not in operation. That is, if a signal has been once output through the output channel o6, the node should receive a return signal from the terminal to which the output channel o6 is connected in response. However, if no return signal is received within a prescribed time period, the switching control unit 5 judges that the node or terminal connected to the output channel o6 is inoperative, thereby preventing the input signal received at the input channel i2 from being supplied to the output channel o6. In this case, in accordance with a control signal 3 with a circle fed from the switching control unit 5 to the switching matrix unit 1, the input channel i2 is prevented from being connected to a particular output channel, such as output channel o6 which is connected to an inoperative node or terminal.

FIG. 14f shows a state in which the direction of transmission has been reversed to be ready for receiving a return signal upon completion of transmission of a forward signal. That is, upon detection of termination of the input signal by the input signal monitoring unit 3, the switching control unit 5 detects this fact through control signals 1 and 2 each with a circle and controls the switching matrix unit 1 through a control signal 3 with a circle such that all of input channels i0 through i7, or a set of input channels i0, i1 and i3 through i7, or another set of input channels i0, i1, (i2), i3 through i5 and i7 are connected to the output channel o2. With this, return information received by any of the input channels thus connected to the output channel o2 can be transmitted to the source terminal from which the forward information has originated.

Figure 14H:
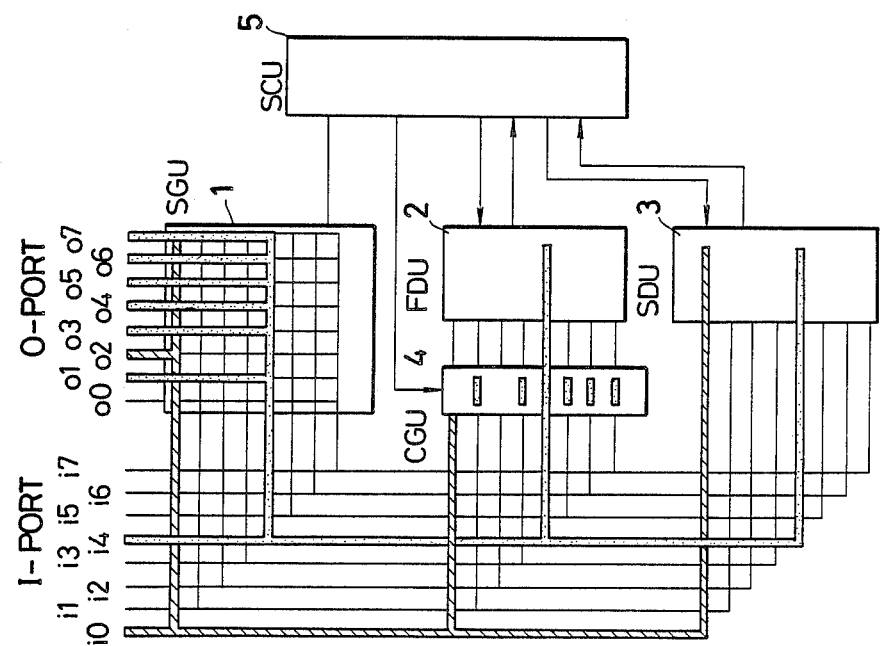
Figure 14G:
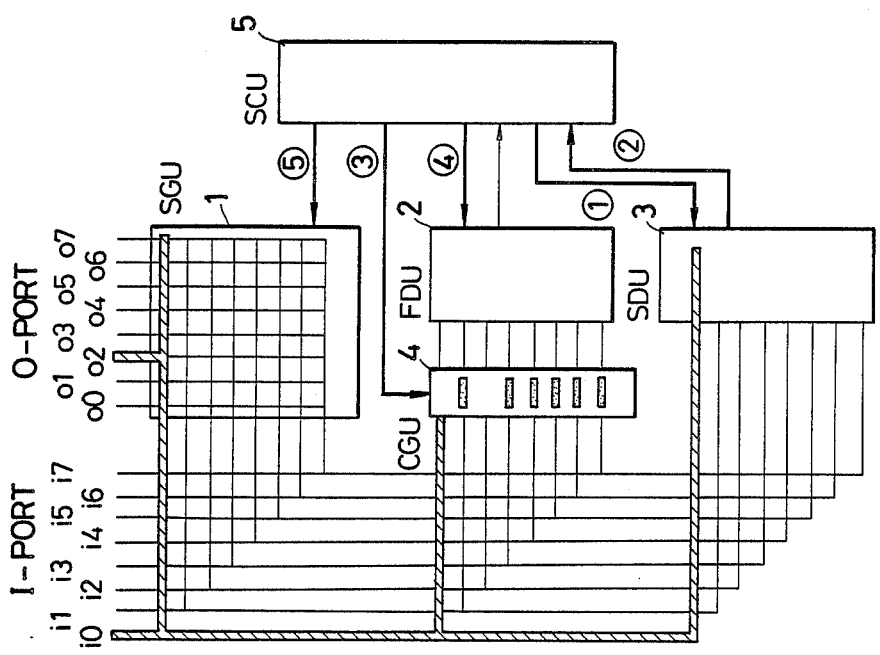

FIG. 14g shows a state in which return information has been input into the input channel i0. In this manner, if the return information in response to the forward information has been received by any of the input channels (input channel i0 in the illustrated example) connected to the output channel o2 within a predetermined time period, this return information is output through the output channel o2.

In the case where a first communication or first transmission path is to be established by the forward information which has been previously transmitted and the return information to be transmitted this time, the input signal monitoring unit 3 detects the fact that the input signal constituting the return information for the first communication has been input into the input channel i0, and, then, this fact is read out by the switching control unit 5 through control signals 1 and 2 each with a circle, whereby this fact is stored into a second memory section of the switching control unit 5. Then, a control signal 3 with a circle is supplied from the switching control unit 5 to the control gate unit 4, thereby causing the input channels i1 and i3 through i7 to be connected to the first arrived input signal detecting unit 2. Then, in accordance with a control signal 4 with a circle supplied from the switching unit 5 to the first arrived signal detecting unit 2 to have the unit 2 reset, and, then, a control signal 5 with a circle is supplied from the switching control unit 5 to the switching matrix unit 1, thereby causing the input channels i1 and i3 through i7 to be connected to the output channels o1 and o3 through o7, respectively. With this, there is established a condition that all of the input channels are ready to receive an input signal excepting a pair of input and output channels i0 and o0 and another pair of input and output channels i2 and o2, which are in use for establishing the first transmission route in the network.

FIG. 14h shows a state in which a plurality of communications are carried out at the same time in the same network. With the input channel i0 being connected to the output channel o2 for establishing the first transmission route, when the input channel i4 has received an input signal, the switching control unit 5 reads out this fact in a manner similarly as described above and controls the switching matrix unit 1 so as to supply this input signal to all of the output channels excepting those o0 and o2 which are currently in use. In this manner, in accordance with the present embodiment, while keeping the input channel i0 connected to the output channel o2 to establish the first transmission route for the first communication, the input channel i4 having received the input signal is connected to the output channels o1 and o3 through o7 as a first step for establishing a second transmission route for a second communication. It goes without saying that it may also be so structured that the input channel i4 having received the input signal is connected to all of the output channels excepting those already in use, such as o2 in the present embodiment, and also excepting its corresponding output channel, such as o4 in the present embodiment.

Thereafter, upon termination of the input signal supplied from the input channel i4 to the output channels o1 and o3 through o7 in the present embodiment, the direction of transmission is reversed in all of the channels excepting those already in use, thereby causing all of the input channels excepting those already in use are connected to the output channel o4 corresponding to the input channel i4 having received the input signal to be set ready for reception of a return signal. Incidentally, if the first communication has already been completed, the direction of transmission is reversed for all of the channels excepting those currently used for the second communication.

It is to be noted that switching matrix unit 1 has a structure as shown in FIG. 3, and, thus, what has been described with reference to FIG. 3 is also applicable here.

Figure 15:
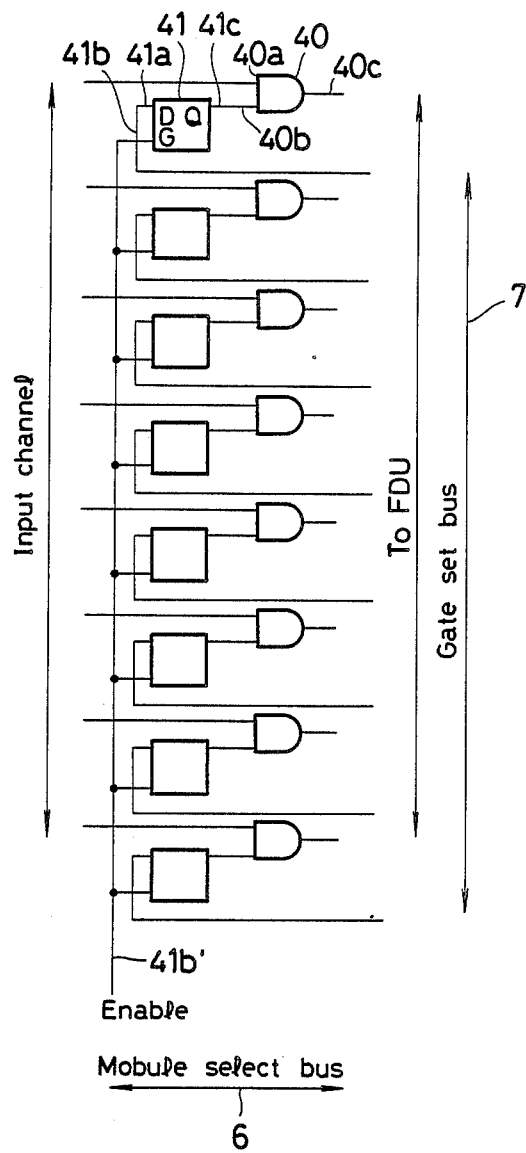
FIG. 15 is a schematic illustration showing the structure of a control gate unit provided in the node shown in FIG. 13.

FIG. 15 schematically shows the detailed structure of the control gate 4 provided in the node shown in FIG. 13. As shown, since the present node is an eight channel device, there are provided eight gates 40 and eight latches 41 connected to the respective gates 40. The control gate 4 thus controls the connection between eight input signal lines extending from the respective input channels and corresponding eight output signal lines extending to the first arrived signal detecting unit 2. Each of the latches 41 has its D terminal 41a connected to the gate set bus 7, its Q terminal 41c to an input terminal 40b of the associated gate 40 and its G terminal 41b to a common enable line 41b' which, in turn, is connected to the module select bus 6. Each of the gates 40 has its output terminal 40c connected to the first arrived input signal detecting unit 2. It is to be noted that the latch used in the switching matrix unit 1 and the control gate 4 in the node of FIG. 13 has a structure shown in FIG. 4.

It should also be noted that this aspect of the present invention may also be applied to the network topology as shown in FIG. 9 and a set of packet signals shown in FIG. 8 may also be used advantageously for this aspect of the present invention. Thus, what has been described with reference to these figures may also be applicable here. In addition, the first arrived signal detecting unit 2 in the node of FIG. 13 has a structure shown in FIG. 3 and the input signal monitoring unit 3 of the node shown in FIG. 13 has a structure shown in FIG. 7. Accordingly, what has been described with FIGS. 3 and 7 are also applicable to the present embodiment.

Now, referring to FIGS. 16a through 16k, another embodiment according to this aspect of the present invention will be described below. In this embodiment, the structure of the switching matrix unit 1 is modified such that crossing lines are not connected at the crossover points along one diagonal line. This has an effect of not connecting an input channel to its corresponding output channel.

Incidentally, in the case where the switching matrix unit 1 is formed by switching elements arranged in the an N by N matrix format, an input channel can be so connected to all of the output channels excepting its corresponding output channel prior to input of an input signal. On the other hand, in the case where the switching matrix unit 1 is formed from switching elements arranged in an N by (N−1) matrix format, then an input channel is not connected to its corresponding output channel as a matter of course. Thus, if use is made of the switching matrix unit 1 having such a structure, the sequence of operation shown in FIG. 14 will become the sequence of operation shown in FIG. 16. In the case of the embodiment shown in FIG. 16, the switching matrix unit 1 has a 8 by 8 matrix format without connection along one diagonal line; however, the switching matrix unit 1 may also be formed by a 8 by 7 matrix format.

Figure 16B:
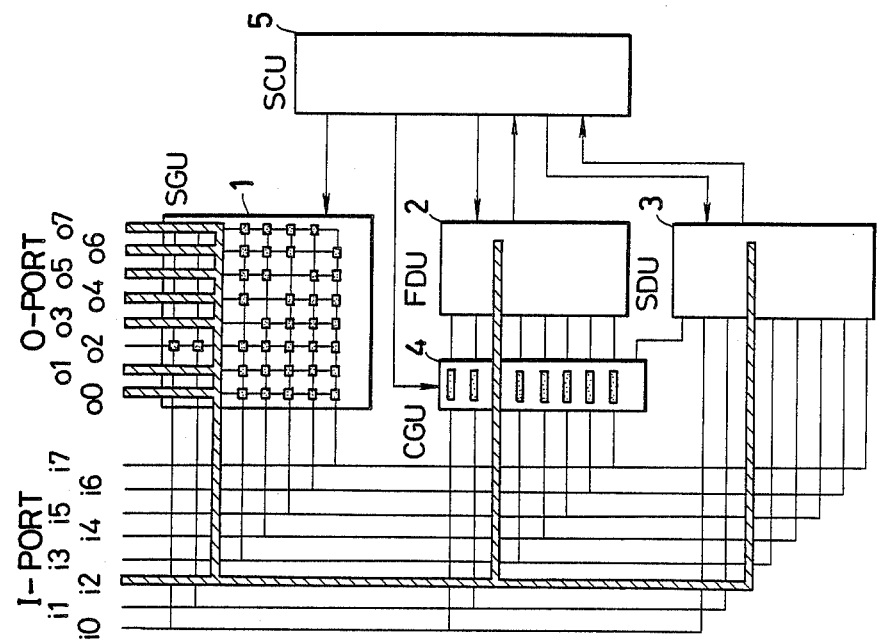
Figure 16A:
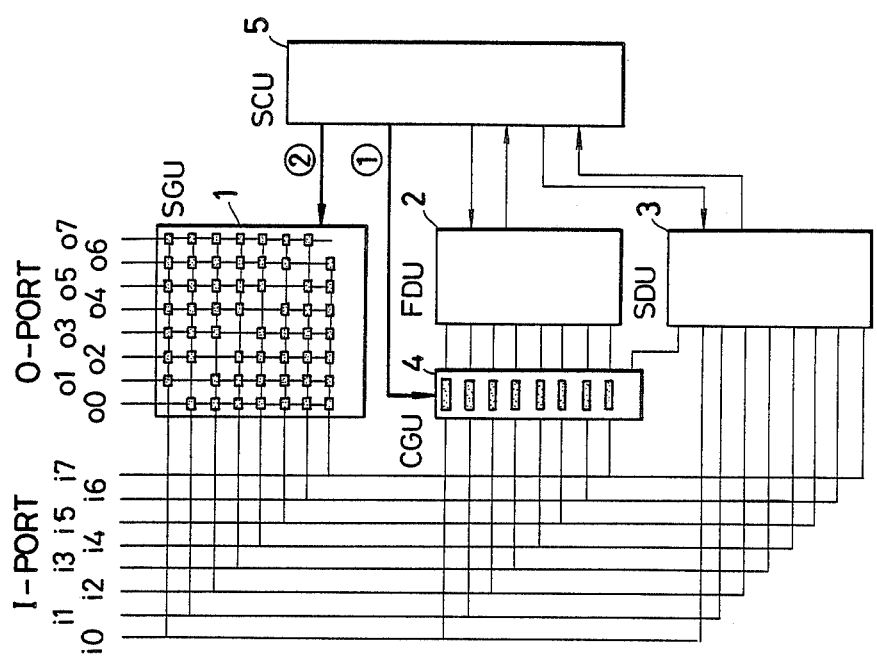

FIG. 16a corresponds to FIG. 14a and thus it shows an initial state. Thus, the switching matrix unit 1 and the control gate 4 are controlled by control signals 2 and 1 each with a circle, respectively, supplied from the switching control unit 5, so that all of the input channels are connected to the first arrived input signal detecting unit 2 and all of the input channels i0 through i7 are connected to all of the output channels o0 through o7, respectively. FIG. 16b corresponds to FIG. 14h and thus it shows a state in which an input signal has been received by the input channel i2. Thus, the input signal is supplied to all of the output channels o0 through o7 from the input channel i2. And, the first arrived input signal detecting unit 2 and the input signal monitoring unit 3 only detect the input channel which has received the input signal in the first place.

Figure 16D:
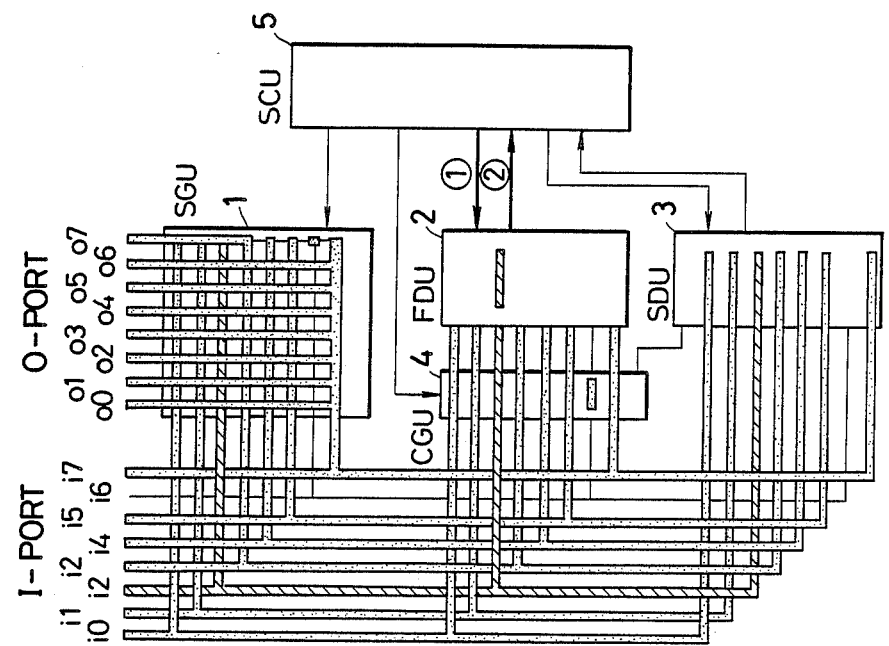
Figure 16C:
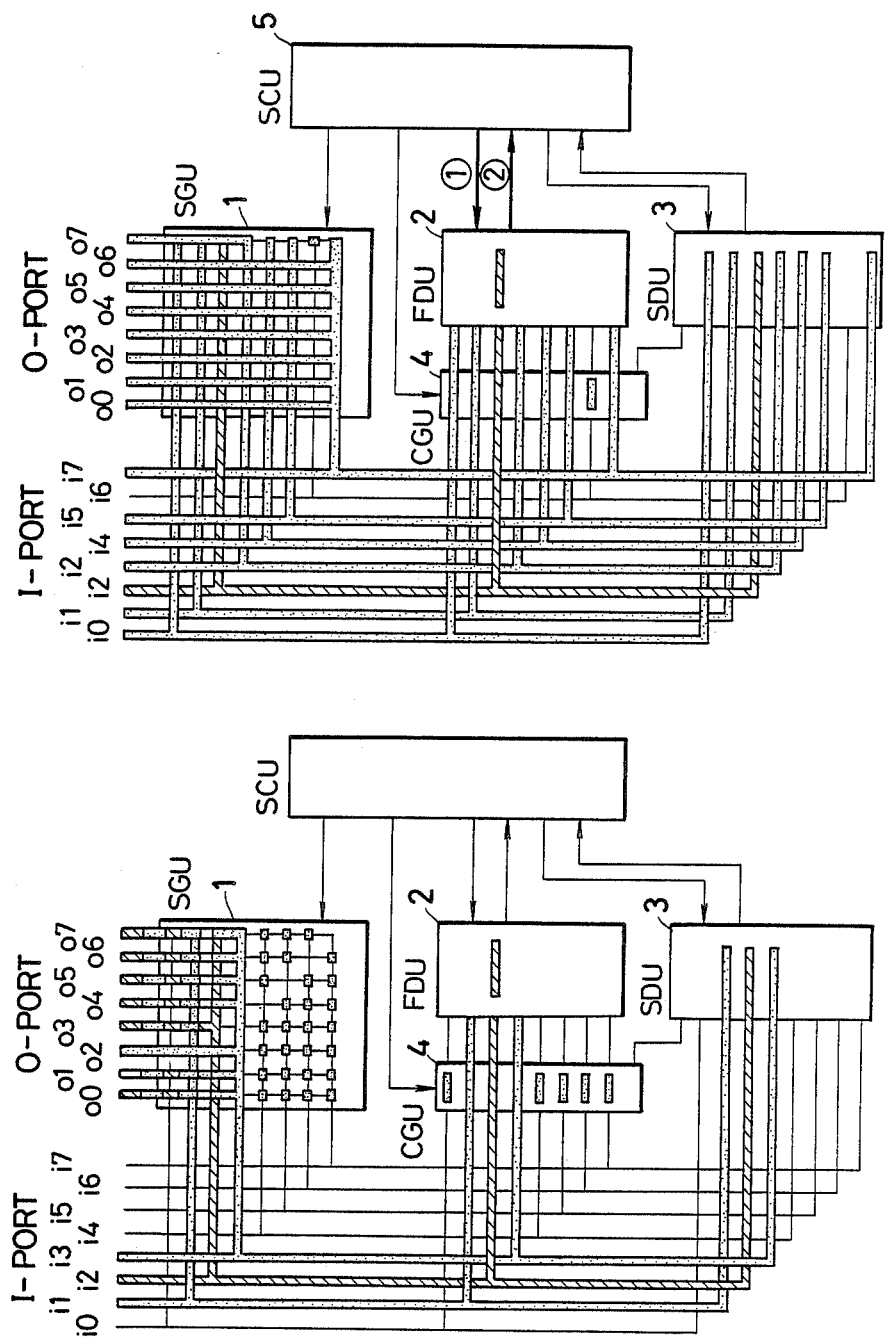
Figure 16F:
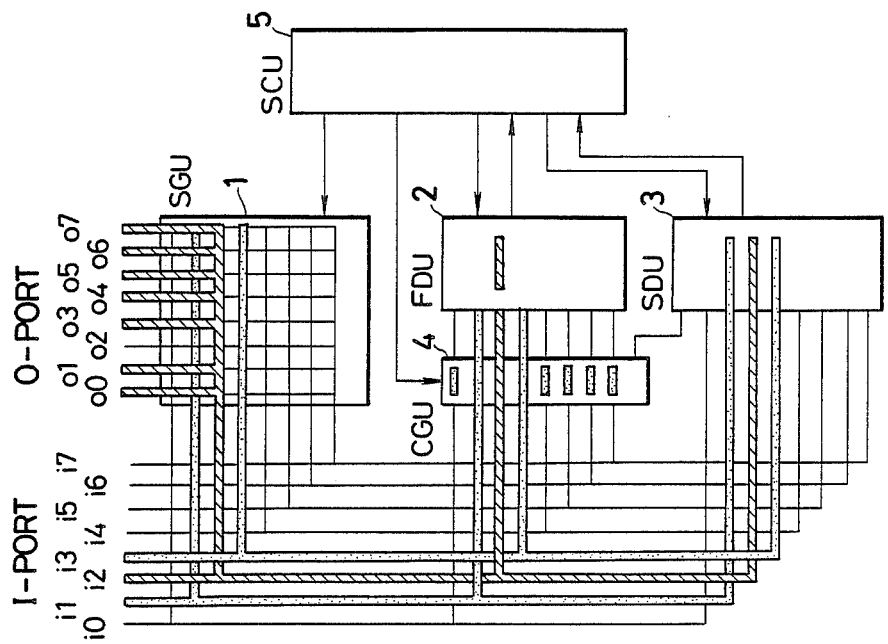
Figure 16E:
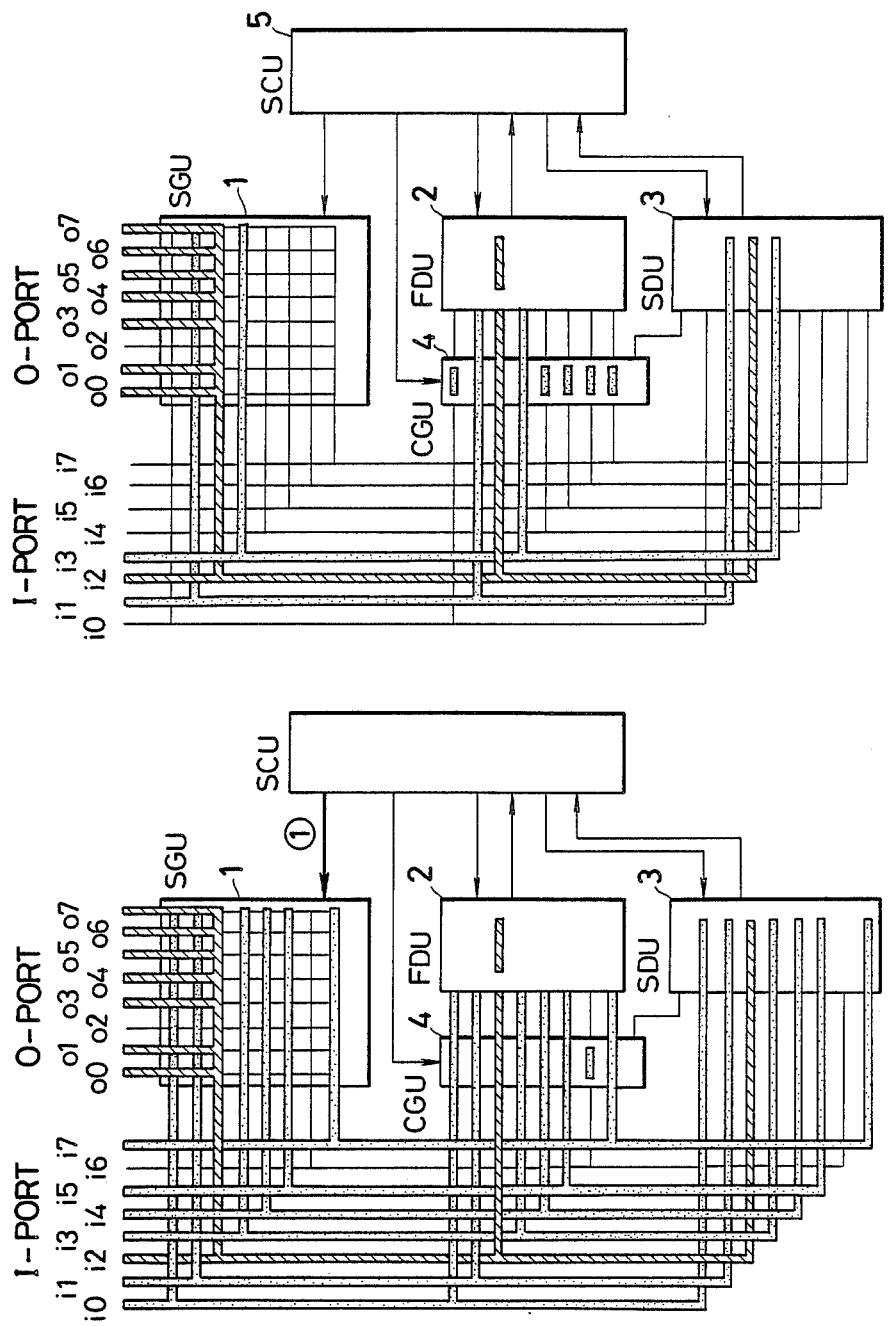

FIG. 16c corresponds to FIG. 14c and thus it shows a state in which two other input signals are subsequently received by the input channels i1 and i3. Thus, the input signal received by each of the input channels i1 and i3 is also supplied to all of the output channels o0 through o7. At this time, the output signals are mixed together and the input signals are also mixed. FIG. 16d corresponds to FIG. 14c and thus it shows a state in which an input signal is also input into each of the remaining input channels i0 and i4 through i7 subsequently and detection of the input channel i2 having received the input channel in the first place is carried out. That is, subsequent to the input channel i2, an input signal is received by the input channels i1 and also i3, and, then, an input signal is also input into the remaining input channels i0, i4 through i5 and i7. In each case, upon receipt of an input signal, the input channel is once connected to all of the output channels excepting its corresponding output channel. At the first arrived input signal detecting unit 2, the input channel i2 which has received the input channel in the first place is detected, and the switching control unit 5 reads out this fact through control signals 1 and 2 each with a circle and stores this fact in the first memory position FIGS. 16e and 16f correspond to FIG. 14d and thus they show a state in which all of the input channels excepting the one which has received the input channel in the first place are disconnected from the output channels. That is, since the switching control unit 5 stores the fact that the input channel i2 is the input channel which has received the input channel in the first place, it controls the switching matrix unit 1 such that all of the input channels excepting the input channel i2 are disconnected from the output channels o0 through o7.

Figure 16H:
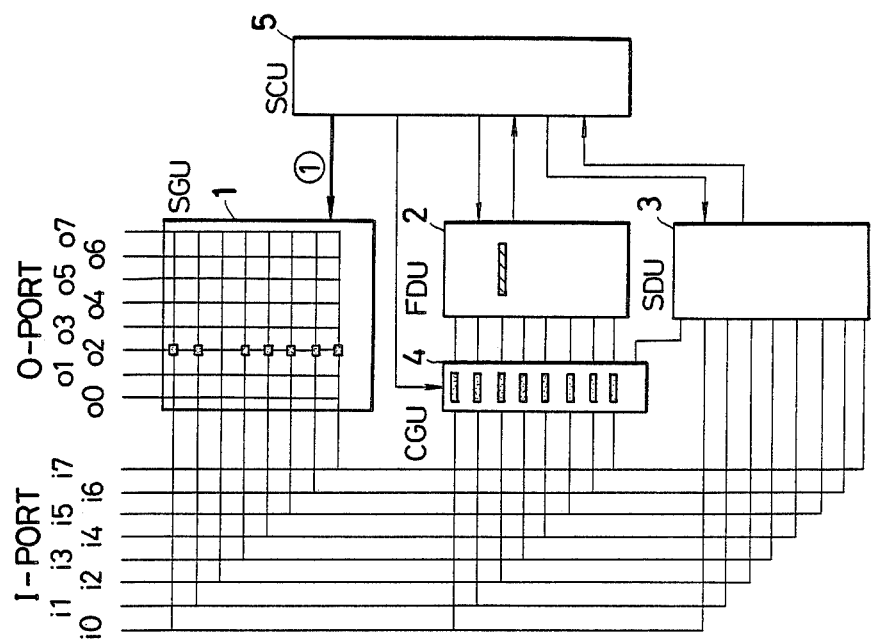
Figure 16G:
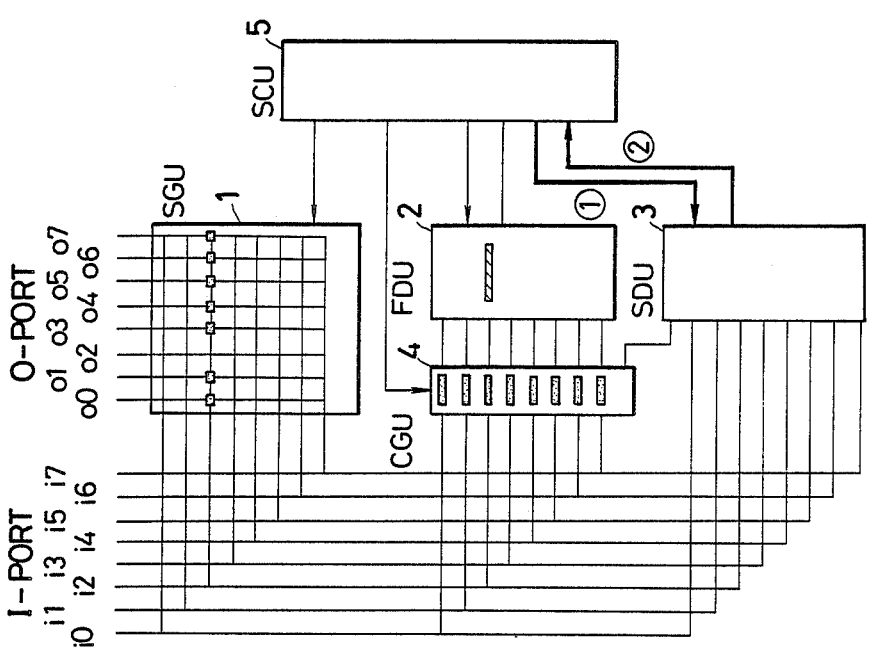

FIGS. 16g and 16h correspond to FIG. 14f and thus it shows a state in which reversing the direction of transmission takes place after termination of the first input signal. That is, when the input signal monitoring unit 3 has detected the termination of the first input signal received at the input channel i2, this fact is read out by the switching control unit 5, and, then, the switching control unit 5 controls the switching matrix unit 1 by a control signal 1 with a circle so as to have the all of the input channels o0 through o7 connected to the output channel o2. In other words, the input channel i2 having received the first input signal is switched to its corresponding output channel o2 so that a return signal entering into any of the input channels can be securely transmitted toward the source terminal.

FIGS. 16i and 16j correspond to FIG. 14g and thus it shows a state in which a return signal or information has just been input into the input channel i0. In the case where the first input signal received at the input channel i2 is first forward information for establishing a first transmission route, a first return signal or information in response to the first forward information is input into any of the input channels within a predetermined time period T1. In the present embodiment, the return information has been received by the input channel i0 so that this information is supplied to the output channel o2. The input signal monitoring unit 3 detects the fact that the input signal defining the first return information responsive to the first forward information has been input into the input channel i0, and, then, the switching control unit 5 reads out this fact from the input signal monitoring unit 3 through control signals 1 and 2 each with a circle, thereby storing this fact in the second memory position. Then, the switching control unit 5 controls the control gate 4 such that the input channels i1 and i3 through i7 are connected to the first arrived input signal detecting unit 2 through the control gate 4, and the first arrived input signal detecting unit 2 is reset, thereby causing the information of the input channel which has received the first input signal of first forward information to be erased. With such a structure, the information for the second, third and any subsequent communications can be input into the switching control unit 5 one after another, which thus allows to establish more than one transmission route in the same network, thereby allowing to carry out a multiple of communications at the same time sharing one or more nodes.

Figure 16K:
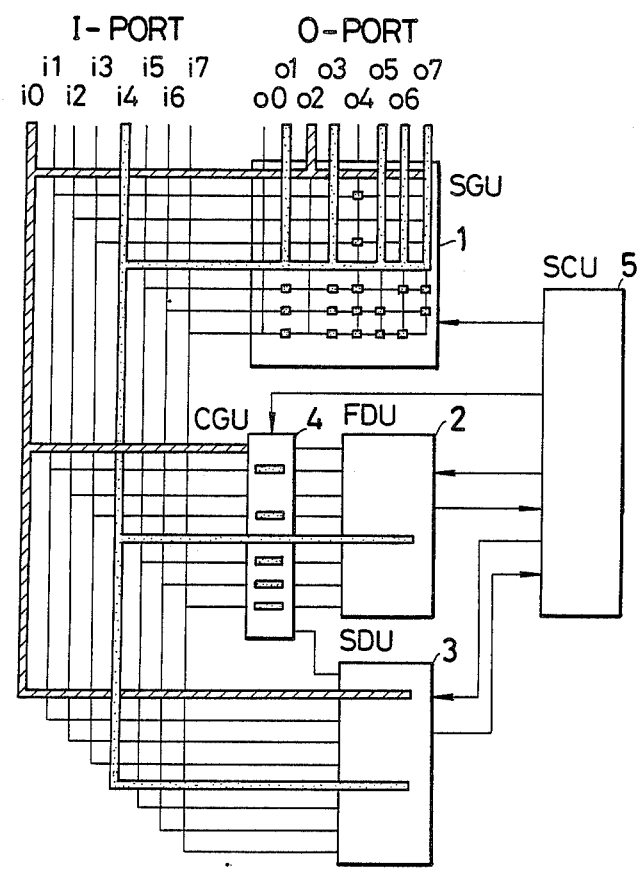

FIG. 16k corresponds to FIG. 14h and thus it shows a state in which a multiple of communications are carried out at the same time through the same node. For establishing a second transmission path for a second communication, the input signal monitoring unit 3 detects the fact that an input signal has been input into the input channel i4. This fact is read out by the switching control unit 5 which then controls the switching matrix unit 1 such that the input channel i4 is connected to all of the output channels excepting o0, o2, which are in use for the first communication, and o4, which corresponds to the input channel i4.

Figure 18:
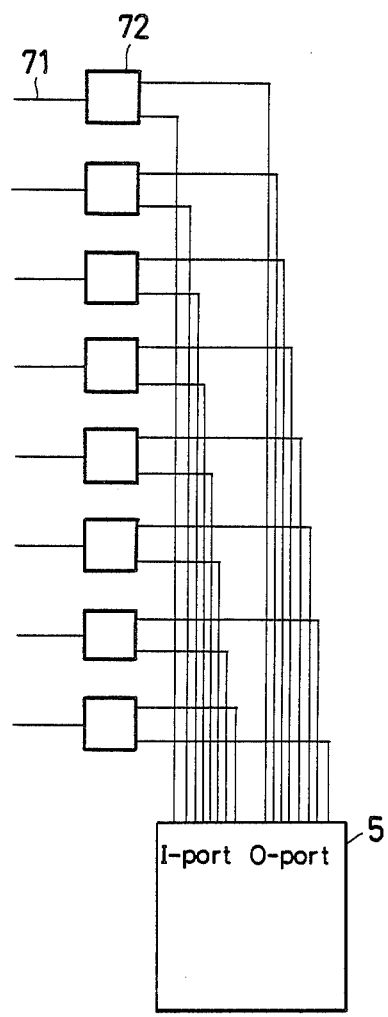
FIG. 18 is a schematic illustration showing the structure of a node constructed in accordance with a further embodiment of the present invention.
Figure 19:
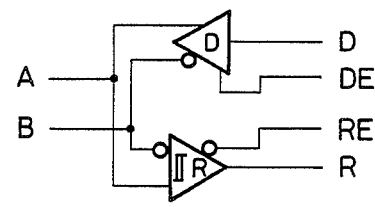
FIG. 19 is a schematic illustration showing the structure of a bidirectional driver which may be used in the present invention advantageously.

FIG. 18 schematically shows a still further embodiment of this aspect of the present invention. In the present embodiment, use is made of a single transmission line 71 for connection between two nodes or a node and a terminal. However, since the transmission line 71 must carry information in opposite directions, it has a bidirectional driver 72 connected at each end, which has a pair of connection lines one of which is connected to a corresponding input port of the switching control unit 5 and the other of which is connected to a corresponding output port of the switching control unit 5. FIG. 19 shows a detailed structure of the bidirectional driver (RS422) 72 used in the structure of FIG. 18. In the structure of FIG. 19, terminals A and B are connected to the transmission line side and driver D, receiver R, driver enable DE and receiver enable RE are connected to the node side. A positive signal supplied from the driver D is coupled to the terminal A, and a signal of the opposite polarity is coupled to the terminal B. And, a signal is taken as a voltage difference between the terminals A and B. On the other hand, the terminal D is connected to the output port and the terminal R is connected to the input port, and DE and RE are controlled by the switching control unit 5 such that transmission and reception are not enabled at the same time.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method of controlling a communication network including a plurality of nodes, each including a plurality of input channels, a plurality of output channels and connection control means for controlling the connection between said input and output channels; a plurality of terminals; and transmission means extending between said nodes and between said nodes and said terminals; wherein said method comprises the steps of:
supplying an input signal received by each of said input channels once to all of said output channels under the control of said connection control means;
detecting the input channel which was the first recipient of said input signal by said connection control means; and
disconnecting all of said input channels excepting said input channel detected to have been the first recipient of said input signal from said output channels by said connection control means.

2. The method of claim 1 wherein, at the supplying step, said input signal is supplied once to all of said output channels excepting predetermined output channels.

3. The method of claim 2 wherein said predetermined output channels include those output channels which are already in use for one or more other communications.

4. The method of claim 3 wherein said predetermined output channels include an output channel which corresponds to said input channel which was the first recipient of said input signal.

5. A node for use in a communication network, comprising:
a plurality of input channels;
a plurality of output channels; and
connection control means for controlling the connection between said input and output channels, said connection control means including a switching matrix unit interposed between said input and output channels, a detecting unit for detecting an input channel which has first received an input signal, a monitoring unit for monitoring said input signal, and a switching control unit in charge of overall operation of said connection control means, wherein when one or more input signals are input into said input channels, each of said input signals is supplied to all of said output channels through said switching matrix unit, and after detecting an input channel which has first received said input signal, all of said input channels excepting said input channel which first received said input signal are disconnected from said output channels.

6. The node of claim 5 wherein said switching matrix unit is controlled by said switching control unit such that each of said input signals received by said input channels is prevented from being supplied to at least one predetermined output channel.

7. The node of claim 6 wherein said at least one predetermined output channel includes at least one output channel already in use for another communication.

8. The node of claim 6 wherein said at least one predetermined output channel includes at least one output channel which corresponds to an input channel which first received said input signal.

9. The node of claim 6 wherein said at least one predetermined output channel includes at least one output channel which is connected to an inoperative node or terminal.

10. A method for controlling a communication network including a plurality of nodes, each of which includes a plurality of input channels, a plurality of output channels and connection control means for controlling the connection between said input and output channels; a plurality of terminals connected to selected ones of said plurality of nodes and transmission means interconnecting said nodes and said terminals, said method comprising the steps of:
detecting a first input channel, which has received a first input signal, by said connection control means;
storing information of said first input channel having received said first input signal in said connection control means;
detecting a second input channel, which has received a second input signal, by said connection control means;
storing information of said second input channel having received said second input signal in said connection control means and then causing said second input signal to be supplied to an output channel corresponding to said first input channel; and
detecting a third input channel, which has received a third input signal, by said connection control means and causing said third input channel to be connected to said output channels excepting those output channels corresponding to said first and second input channels stored in said connection control means.

11. The method of claim 10 wherein said third input signal is supplied to said output channels excepting at least one predetermined output channel.

12. The method of claim 11 wherein said at least one predetermined output channel includes an output channel which corresponds to said third input channel.

13. The method of claim 11 wherein said at least one predetermined output channel includes an output channel which is connected to an inoperative node or terminal and this information is stored in said connection control means.

14. The method of claim 10 wherein said first and second input signals are a first forward signal transmitted from a first source terminal and a first return signal transmitted from a first destination terminal in response to said first forward signal, respectively, so as to establish a first transmission path for first communication.

15. The method of claim 14 wherein said third input signal is a second forward signal transmitted from a second source terminal toward a second destination terminal.

16. The method of claim 15 further comprising the steps of storing information of said third input channel in said connection control means; detecting a fourth input channel, which has received a fourth input signal, by said connection control means; and storing information of said fourth input channel and causing said fourth input signal to be supplied to an output channel corresponding to said third input channel, thereby establishing a second transmission path for second communication.

17. A node for use in a communication network, comprising:
a plurality of input channels;
a plurality of output channels; and
connection control means for controlling connection between said input and output channels, said connection control means including a switching matrix unit interposed between said input and output channels, a detecting unit for detecting an input channel which has received an input signal in the first place, gating means interposed between said input channels and said detecting unit for allowing said input channels to be connected to said detecting unit selectively, a monitoring unit for monitoring said input signal, and a switching control unit in charge of overall operation of said connection control means.

18. The node of claim 17 wherein said switching matrix unit is so structured that each of said input channels is not connected to corresponding one of said output channels.

* * * * *